United States Patent
Nito et al.

(10) Patent No.: US 7,347,890 B2
(45) Date of Patent: *Mar. 25, 2008

(54) CYAN INK, INK SET, SET OF INK AND REACTION LIQUID, AND IMAGE FORMING METHOD

(75) Inventors: Yasuhiro Nito, Yokohama (JP); Mikio Sanada, Yokohama (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/313,959

(22) Filed: Dec. 22, 2005

(65) Prior Publication Data

US 2006/0103703 A1 May 18, 2006

Related U.S. Application Data

(63) Continuation of application No. PCT/JP2005/012280, filed on Jun. 28, 2005.

(30) Foreign Application Priority Data

Jun. 28, 2004 (JP) ............................. 2004-190493

(51) Int. Cl.
 *C09D 11/02* (2006.01)
(52) U.S. Cl. .................... 106/31.27; 106/31.6
(58) Field of Classification Search ............. 106/31.27, 106/31.6
 See application file for complete search history.

(56) References Cited

U.S. PATENT DOCUMENTS

| | | | |
|---|---|---|---|
| 5,451,251 A | 9/1995 | Mafune et al. | 106/22 H |
| 5,571,313 A | 11/1996 | Mafune et al. | 106/22 H |
| 5,911,815 A | 6/1999 | Yamamoto et al. | 106/31.27 |
| 6,027,210 A | 2/2000 | Kurabayashi et al. | 347/100 |

(Continued)

FOREIGN PATENT DOCUMENTS

EP 0 651 037 A1 5/1995

(Continued)

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

Provided is a cyan ink applicable to an ink set having four kinds of aqueous inks composed of the cyan ink, a magenta ink, a yellow ink, and a black ink each containing water; a water-insoluble coloring material; and plurality of water-soluble organic solvents including a good medium or good mediums for the water-insoluble coloring material and a poor medium or poor mediums for the water-insoluble coloring material. The content of the water-insoluble coloring material in the cyan ink is in a specific range, and the ratio $B_1/A_1$ between the good medium and the poor medium is also in a specific range. A water-soluble organic solvent showing the maximum Ka value out of respective Ka values of the plurality of water-soluble organic solvents is the poor medium. The ratio A/B between the good medium and the poor medium in an arbitrary aqueous ink in the ink set except the cyan ink and $B_1/A_1$ satisfy a specific relationship. The cyan ink provides an image having a sufficiently large area factor even with a small amount of ink droplets, and having a high image density, and is excellent in storage stability and bronzing resistance.

7 Claims, 13 Drawing Sheets

U.S. PATENT DOCUMENTS

| | | | |
|---|---|---|---|
| 6,062,674 A | 5/2000 | Inui et al. | 347/43 |
| 6,174,354 B1 | 1/2001 | Takizawa et al. | 106/31.43 |
| 6,221,141 B1 | 4/2001 | Takada et al. | 106/31.6 |
| 6,280,513 B1 | 8/2001 | Osumi et al. | 106/31.6 |
| 6,332,919 B2 | 12/2001 | Osumi et al. | 106/31.6 |
| 6,375,317 B1 | 4/2002 | Osumi et al. | 347/100 |
| 6,387,168 B1 | 5/2002 | Koitabashi et al. | 106/31.6 |
| 6,425,662 B1 | 7/2002 | Teraoka et al. | 347/100 |
| 6,498,222 B1 * | 12/2002 | Kitamura et al. | 526/307.2 |
| 6,511,534 B1 | 1/2003 | Mishina et al. | 106/31.33 |
| 6,641,652 B2 * | 11/2003 | Ouchi et al. | 106/31.6 |
| 6,706,105 B2 | 3/2004 | Watanabe et al. | 106/31.6 |
| 6,770,331 B1 | 8/2004 | Mielke et al. | 427/496 |
| 6,874,881 B2 | 4/2005 | Shirota et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,005,461 B2 | 2/2006 | Sanada et al. | 523/160 |
| 7,029,109 B2 | 4/2006 | Shirota et al. | 347/100 |
| 7,055,943 B2 | 6/2006 | Suzuki et al. | 347/100 |
| 7,128,779 B2 | 10/2006 | Osumi et al. | 106/31.52 |
| 7,144,449 B2 | 12/2006 | Udagawa et al. | 106/31.15 |
| 7,160,376 B2 | 1/2007 | Watanabe et al. | 106/31.6 |
| 2002/0096085 A1 | 7/2002 | Gotoh et al. | 106/31.86 |
| 2004/0252172 A1 * | 12/2004 | Hiraoka et al. | 347/100 |
| 2005/0005818 A1 | 1/2005 | Sato et al. | 106/31.27 |
| 2005/0024458 A1 * | 2/2005 | Sanada et al. | 347/100 |
| 2005/0088501 A1 * | 4/2005 | Nagashima et al. | 347/100 |
| 2005/0219341 A1 | 10/2005 | Nito et al. | 347/100 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0066699 A1 * | 3/2006 | Tokuda et al. | 347/100 |
| 2006/0089424 A1 | 4/2006 | Sanada et al. | 523/160 |
| 2006/0096498 A1 | 5/2006 | Tsujimura et al. | 106/31.27 |
| 2006/0098067 A1 | 5/2006 | Imai et al. | 347/100 |
| 2006/0098068 A1 * | 5/2006 | Hakamada et al. | 347/100 |
| 2006/0100311 A1 | 5/2006 | Tokuda et al. | 523/160 |
| 2006/0103704 A1 * | 5/2006 | Hakamada et al. | 347/100 |
| 2006/0125895 A1 | 6/2006 | Nito et al. | 347/100 |
| 2006/0125896 A1 | 6/2006 | Aikawa et al. | 347/100 |
| 2006/0135647 A1 | 6/2006 | Ichinose et al. | 523/160 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osumi et al. | 347/100 |
| 2006/0142417 A1 | 6/2006 | Kaneko et al. | 523/160 |
| 2006/0152570 A1 | 7/2006 | Ishikawa et al. | 347/105 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |

FOREIGN PATENT DOCUMENTS

| | | |
|---|---|---|
| EP | 1 156 086 A1 | 11/2001 |
| EP | 1 577 353 A1 | 9/2005 |
| JP | 10-279869 | 10/1998 |
| JP | 11-124527 | 5/1999 |
| JP | 2000-63719 | 2/2000 |
| JP | 2000-198955 | 7/2000 |
| JP | 2001-11348 | 1/2001 |
| JP | 2003-507517 | 2/2003 |
| JP | 2005-206615 | 8/2005 |
| WO | WO 01/40390 A1 | 6/2001 |
| WO | WO 01/51566 A1 | 7/2001 |

* cited by examiner

FIG. 11A
FIG. 11B
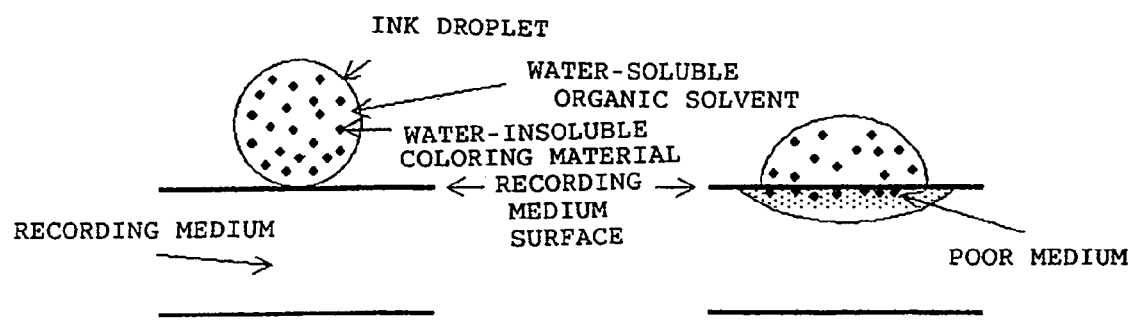
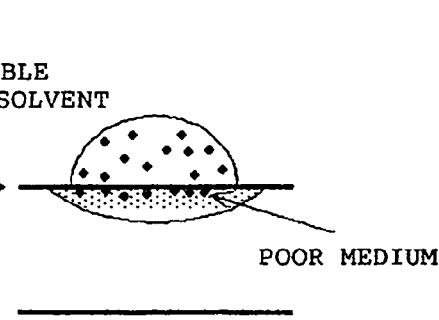
FIG. 11C
FIG. 11D
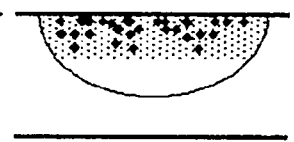

FIG. 12A
FIG. 12B
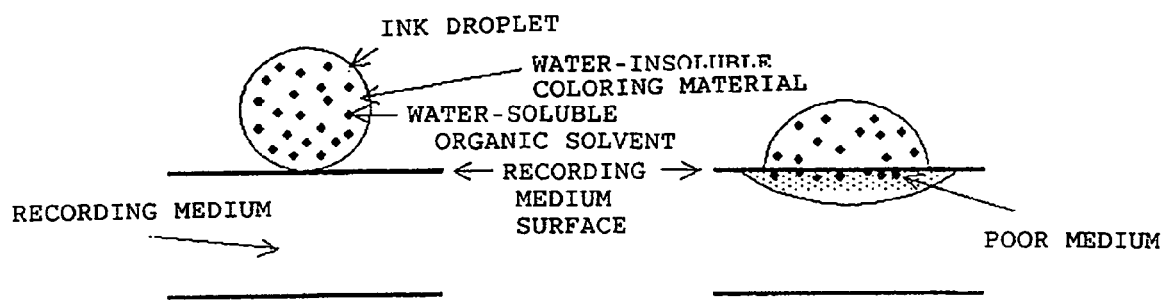
FIG. 12C
FIG. 12D
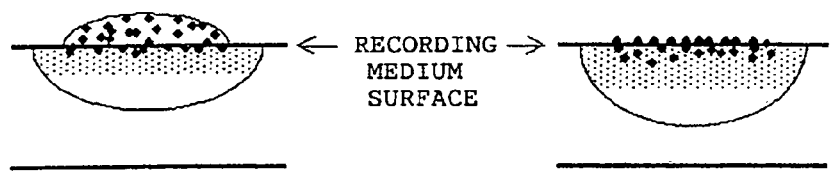

CYAN INK, INK SET, SET OF INK AND REACTION LIQUID, AND IMAGE FORMING METHOD

This application is a continuation of International Application No. PCT/JP2005/012280, filed Jun. 28, 2005, which claims the benefit of Japanese Patent Application No. 2004-190493, filed Jun. 28, 2004.

BACKGROUND OF THE INVENTION

1. Field of the Invention

The present invention relates to: a cyan ink containing a water-insoluble coloring material; and an ink set having the same. More specifically, the present invention relates to a cyan ink suitable for an ink-jet recording method.

2. Related Background Art

Ink containing, as a coloring agent, a water-insoluble coloring material such as a pigment (pigment ink) has been conventionally known to provide an image excellent in fastness such as water resistance and light resistance. Various techniques have been recently proposed for the purpose of increasing the image density of an image formed by means of such ink.

For example, there has been proposed the use of ink containing self-dispersion carbon black and a specific salt to achieve an additional increase in image density (see, for example, Japanese Patent Application Laid-open No. 2000-198955). A technique has also been proposed, which involves applying onto a recording medium an ink-jet recording ink, which is a composition containing a pigment, polymer fine particles, a water-soluble organic solvent and water as well as a polyvalent-metal-salt-containing aqueous solution; and causing the ink composition and the polyvalent-metal-salt-containing aqueous solution to react with each other to form a high-quality image (see, for example, Japanese Patent Application Laid-open No. 2000-63719). In each of those techniques, a pigment present in ink in a dispersed state is forcedly flocculated at the surface of a recording medium to suppress the permeation of the pigment into the recording medium, thereby obtaining an image with an increased density.

The investigation by the inventors of the present invention has revealed that each of the above techniques may not provide a sufficient area by which the surface of a recording medium can be covered with a coloring material relatively to the volume of an ink droplet (so-called an area factor) because pigment particles are flocculated on the recording medium. This finding means that each of the above techniques requires an increased amount of ink to be applied as compared to that of conventional pigment ink obtained by dispersing a pigment by means of a polymer dispersant or the like for obtaining the same image density, and each of the above techniques is susceptible to improvement in this respect. There are methods of obtaining a large area factor even with an ink droplet having a small volume by improving the permeability of ink into a recording medium. However, when the permeability of ink is improved, the ink permeates into not only the surface of a recording medium but also the depth direction of the recording medium, so sufficient image density may not be obtained.

The inventors of the present invention have pursued the advantages and disadvantages of the respective conventional inks and analyzed the characteristics of an image itself. As a result, they have revealed that, when a coloring material is present in ink in a high concentration, a large amount of excessive coloring material is present on the surface of a recording medium, or dots having visually different shapes are formed, and that a waste coloring material not involved in color development is present in the recording medium.

When one attempts to increase the coloring material content of cyan ink to increase image density, in an image formed on, for example, a recording medium having surface gloss, in particular, a phenomenon in which metallic luster occurs depending on the angle at which the image is seen (bronzing) occurs. The bronzing has been found to occur more remarkably when a larger amount of pigment flocculates is present on the surface of a recording medium.

A reduction in coloring material content of cyan ink is expected to suppress the bronzing, that is, to obtain excellent bronzing resistance. However, the following has been found. When cyan ink is used in combination with any other ink to form an image, a reduction in coloring material content of only the cyan ink may reduce the image density of an image to be formed by the cyan ink or may affect the color tone of an image to be formed by color mixing of the cyan ink and other ink such as green ink or blue ink, so an image may be poor in color balance.

The inventors of the present invention have found that an image superior to a conventional one can be formed by solving at least one of the above technical problems. The present invention solves at least one of the following problems found by the inventors of the present invention.

(1) A problem in which, when a pigment present in ink in a dispersed state is forcedly flocculated at the surface of a recording medium, an area by which the surface of the recording medium can be covered with a coloring material (so-called an area factor) may not be sufficient relatively to the volume of an ink droplet, so the amount of ink to be applied necessary for obtaining the same image density increases.

(2) A problem in which, when the permeability of ink is improved, the ink permeates into not only the surface of a recording medium but also the depth direction of the recording medium, so a coloring material cannot be distributed in a high concentration near the surface of the recording medium, and hence a high image density cannot be achieved.

(3) A problem in which, when an image is formed on a recording medium having surface gloss by means of an ink set having at least four kinds of aqueous inks composed of cyan ink, magenta ink, yellow ink, and black ink, each of which has an increased coloring material content for the purpose of increasing the image density on a recording medium such as plain paper, through color mixing of the inks of respective colors, bronzing occurs at an image portion formed by the cyan ink. A problem in which an image is poor in color balance when the coloring material content of the cyan ink in the ink set is reduced for suppressing the bronzing.

SUMMARY OF THE INVENTION

Therefore, an object of the present invention is to provide a cyan ink which: provides an image having a sufficiently large area factor even with a small amount of ink droplets, and having a high image density; and is excellent in storage stability.

Another object of the present invention is to provide a cyan ink capable of improving bronzing resistance in the case where an image is formed by means of plurality of inks each of which provides an image having a sufficiently large area factor even with a small amount of ink droplets, and having a high image density.

Another object of the present invention is to provide an ink set which is excellent in: color balance in the case where an image is formed by means of plurality of inks each of which provides an image having a sufficiently large area factor even with a small amount of ink droplets, and having a high image density; and storage stability.

The above objects are achieved by the present invention. That is, according to one aspect of the present invention, there is provided a cyan ink applicable to an ink set having four kinds of aqueous inks composed of the cyan ink, magenta ink, yellow ink, and black ink each containing at least: water; a water-insoluble coloring material; and plurality of water-soluble organic solvents including a good medium or good mediums for the water-insoluble coloring material and a poor medium or poor mediums for the water-insoluble coloring material, the cyan ink being characterized in that the ratio $B_1/A_1$ is 0.5 or more and 3.0 or less, when $A_1$ denotes the total content (mass %) of the good medium in the cyan ink and $B_1$ denotes the total content (mass %) of the poor medium in the cyan ink; a water-soluble organic solvent showing the maximum Ka value out of respective Ka values of the plurality of water-soluble organic solvents each determined by the Bristow method is the poor medium; and that the ratio B/A satisfies the following expression (I), when A denotes the total content (mass %) of the good medium in an arbitrary aqueous ink in the ink set except the cyan ink and B denotes the total content (mass %) of the poor medium in the arbitrary aqueous ink.

$$(B_1/A_1)/(B/A) > 1 \qquad (I)$$

According to another aspect of the present invention, there is provided an ink set characterized by including four kinds of aqueous inks composed of the cyan ink having the above constitution, and magenta ink, yellow ink, and black ink each containing at least water; a water-insoluble coloring material; and plurality of water-soluble organic solvents including a good medium or good mediums for the water-insoluble coloring material and a poor medium or poor mediums for the water-insoluble coloring material.

According to another aspect of the present invention, there is provided a set of an ink and a reaction liquid, characterized in that: the ink is at least one kind of aqueous ink in the ink set having the above constitution; and the reaction liquid destabilizes the dispersed state of the water-insoluble coloring material in the aqueous ink by coming into contact with the at least one kind of aqueous ink in the ink set.

According to another aspect of the present invention, there is provided an image forming method by means of set of the ink and reaction liquid of the above constitution, characterized by including the steps of: (i) applying the reaction liquid to a recording medium; and (ii) applying at least one aqueous ink in the ink set to the recording medium to which the reaction liquid has been fixed.

According to another aspect of the present invention, there is provided a cyan ink applicable to an image forming apparatus using the cyan ink, magenta ink, and yellow ink each containing at least: water; a water-insoluble coloring material; and plurality of water-soluble organic solvents including a good medium or good mediums for the water-insoluble coloring material and a poor medium or poor mediums for the water-insoluble coloring material, the cyan ink being characterized in that the ratio $B_1/A_1$ is 0.5 or more and 3.0 or less, when $A_1$ denotes the total content (mass %) of the good medium in the cyan ink and $B_1$ denotes the total content (mass %) of the poor medium in the cyan ink; a water-soluble organic solvent showing the maximum Ka value out of respective Ka values of the plurality of water-soluble organic solvents as each determined by the Bristow method is the poor medium; and that the ratio B/A satisfies the following expression (I), when A denotes the total content (mass %) of the good medium in an arbitrary aqueous ink applicable to the image forming apparatus except the cyan ink and B denotes the total content (mass %) of the poor medium in the arbitrary aqueous ink.

$$(B_1/A_1)/(B/A) > 1 \qquad (I)$$

A technical gist of the present invention is conceptually summarized as follows. That is, the technical gist of the present invention is a cyan ink containing: water; a water-insoluble coloring material; and plurality of water-soluble organic solvents, the cyan ink being characterized in that the plurality of water-soluble organic solvents include a good medium or good mediums for the water-insoluble coloring material and a poor medium or poor mediums for the water-insoluble coloring material; a water-soluble organic solvent showing the maximum Ka value out of respective Ka values of the plurality of water-soluble organic solvents as each determined by the Bristow method is the poor medium; and the poor medium permeates into a recording medium ahead of the good medium and the poor medium promotes flocculation of the water-insoluble coloring material in a liquid medium rich in the good medium on the surface of the recording medium.

This constitution eliminates the need for incorporating a large amount of waste coloring material, which is present in a recording medium in a scattered state not to contribute to image density, into ink unlike the conventional aqueous ink. In addition, it provides an image of an ideal state. That is, there is no need to cause a large amount of coloring material to be present on a recording surface of a recording medium. At the same time, in the recording medium, the coloring material does not reach the surface opposite to the recording surface (recording can be performed on both surfaces). As a result, a uniform image having a high image density can be formed on the recording surface of the recording medium.

Another technical gist of the present invention is conceptually summarized as follows. That is, it is a cyan ink used for forming an image by means of plurality of inks, the cyan ink being characterized in that the ratio of poor medium to good medium in the cyan ink is higher than the ratio of poor medium to good medium in any other ink except the cyan ink.

This constitution enables an image density and a color balance to be improved when plain paper is used as a recording medium, and enables bronzing resistance to be improved when a recording medium having surface gloss is used as a recording medium. As a result, a high-quality image can be obtained even when each of recording media having different properties such as plain paper and a recording medium having surface gloss are used.

According to the present invention, there can be provided a cyan ink which provides an image having a sufficiently large area factor even with a small amount of ink droplets, and having a high image density; and is excellent in storage stability. According to another embodiment of the present invention, there can be provided a cyan ink capable of improving bronzing resistance in the case where an image is formed by means of plurality of inks each of which provides an image having a sufficiently large area factor even with a small amount of ink droplets, and having a high image density. According to still another embodiment of the present invention, there can be provided an ink set which is excellent in color balance in the case where an image is formed by means of plurality of inks each of which provides an image having a sufficiently large area factor even with a small amount of ink droplets, and having a high image density; and storage stability.

BRIEF DESCRIPTION OF THE DRAWINGS

FIGS. 10A, 10B, 10C, and 10D are views for schematically explaining a state where a droplet of an aqueous ink of the present invention impacts on the surface of a recording medium (plain paper), in which FIG. 10A shows a state before the impact, FIG. 10B shows a state immediately after the impact, FIG. 10C shows a state during the formation of a dot, and FIG. 10D shows a state where the dot is formed.

FIGS. 11A, 11B, 11C, and 11D are views for schematically explaining a state where a droplet of an aqueous ink (having a small B/A value) of the present invention impacts on the surface of a recording medium, in which FIG. 11A shows a state before the impact, FIG. 11B shows a state immediately after the impact, FIG. 11C shows a state during the formation of a dot, and FIG. 11D shows a state where the dot is formed.

FIGS. 12A, 12B, 12C, and 12D are views for schematically explaining a state where a droplet of an aqueous ink (having a large B/A value) of the present invention impacts on the surface of a recording medium, in which FIG. 12A shows a state before the impact, FIG. 12B shows a state immediately after the impact, FIG. 12C shows a state during the formation of a dot, and FIG. 12D shows a state where the dot is formed.

DETAILED DESCRIPTION OF THE PREFERRED EMBODIMENTS

Figure 1:
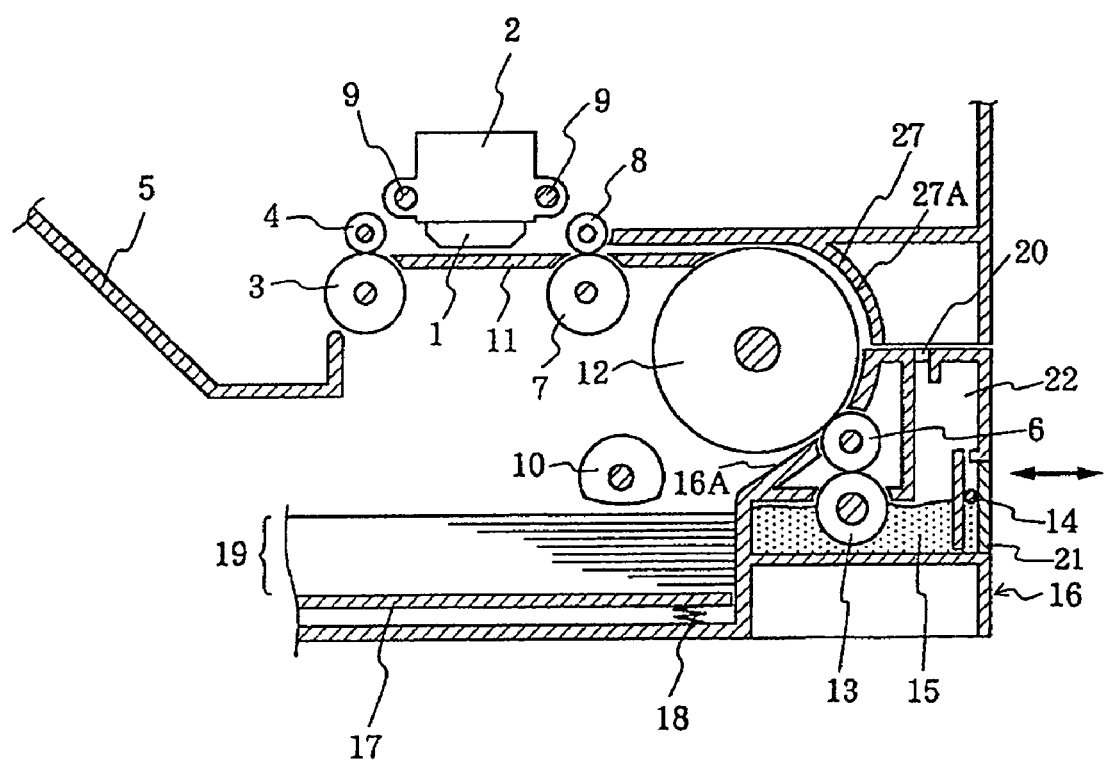
FIG. 1 is a schematic side sectional view showing an example of an ink-jet recording apparatus.

Hereinafter, the present invention will be described in more detail by way of the best mode for carrying out the invention.

First, a poor medium and a good medium in the present invention will be described. Details about the definition of each of the poor medium and good medium will be described later. A water-soluble organic solvent having good dispersion stability of a water-insoluble coloring material to be used as a coloring material is defined as a good medium, and a water-soluble organic solvent having poor dispersion stability of the water-insoluble coloring material is defined as a poor medium irrespective of a method of dispersing the water-insoluble coloring material.

The aqueous ink according to the present invention is further characterized in that when paying attention to water-soluble organic solvents to be incorporated into the ink together with a water-insoluble coloring material, the water-soluble organic solvents each having a function of dissolving or dispersing the water-insoluble coloring material are classified into one showing behavior as the poor medium for the water-insoluble coloring material and one showing behavior as the good medium with respect thereto; and the ratio of the poor medium to the good medium (B/A value) in the ink is adjusted to fall within a specific range to design the ink. The ink according to the present invention is also characterized in that a water-soluble organic solvent showing the maximum Ka value (a measurement method will be described later) out of respective Ka values of the plurality of water-soluble organic solvents as each determined by the Bristow method is the poor medium in addition to the condition that the water-soluble organic solvents have the above specific constitutions.

As a result, an ink can be obtained, which has very excellent dispersion stability of the water-insoluble coloring material in the ink; provides an image having a sufficiently large area factor even with a small amount of ink droplets, and having a high image density when printing is performed on a recording medium, especially plain paper; and is excellent in storage stability.

The details to arrive at the present invention will be described below. The inventors of the present invention have made various studies to suppress bronzing remarkably occurring when an image is formed on a recording medium having surface gloss by means of a cyan ink containing a water-insoluble coloring material. As a result, the inventors have found that methods of suppressing bronzing are roughly classified into two types. To be specific, the two types are a method involving increasing the ratio of the content of a specific resin to the content of the water-insoluble coloring material in the ink and a method involving reducing the content of the water-insoluble coloring material in the ink.

However, the former method is not preferable from the viewpoint of reliability such as storage stability or sticking resistance because the viscosity of ink is apt to increase when a resin is added to the ink to such an extent that bronzing resistance is obtained. On the other hand, in the latter method, when a coloring material content is reduced to such an extent that bronzing resistance is obtained, a sufficient image density cannot be obtained in the case where an image is to be formed on a recording medium such as plain paper by means of the ink, and another problem, loss of a color balance, occurs.

In view of the foregoing, the inventors of the present invention have made additional studies. As a result, they have found that bronzing in a recording medium having surface gloss can be suppressed and a sufficient image density and a sufficient color balance in a recording medium such as plain paper can be obtained by utilizing properties of a water-soluble organic solvent and a water-insoluble coloring material in ink.

[Mechanism of Image Formation]

Here, an example of a mechanism of image formation in the present invention will be described. As described above, the aqueous ink according to the present invention is expected to provide a very excellent image density and a very excellent color balance by means of the properties of a water-soluble organic solvent and a water-insoluble coloring material by reason of the following when the ink is printed on a recording medium, especially plain paper, even if the ink has such a low coloring material content that bronzing resistance is obtained.

Figure 10A:
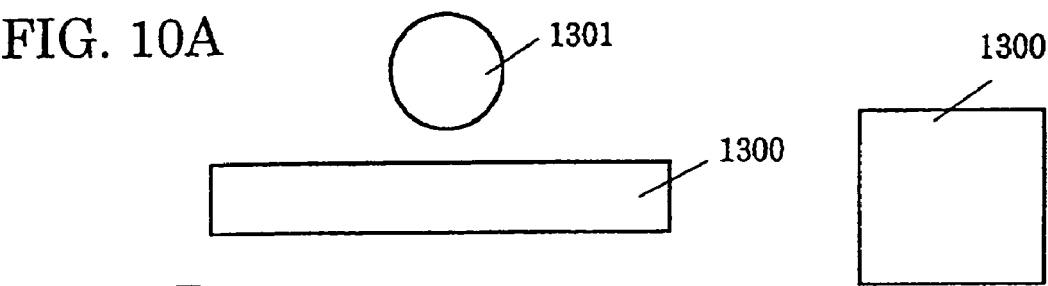

That is, as shown in FIG. 10A, when an ink droplet 1301 according to the present invention is printed on a recording medium 1300 such as plain paper, the ratios of the good medium, the poor medium, and the water-insoluble coloring material to the water and the water-insoluble coloring material in ink start to change at the time when the ink impacts on the recording medium. In other words, as shown in FIGS. 10B and 10C, after the ink droplet 1301 has impacted on the surface of the recording medium 1300, as the ink is fixed to the recording medium, a poor medium 1307 having a higher Ka value, rather than a good medium having a lower Ka value, out of the water-soluble organic solvents in the ink scatters in a nearly complete circle form at a position nearer the surface of the recording medium with the evaporation of water, so an ink dot is expected to be formed.

Figure 10B:
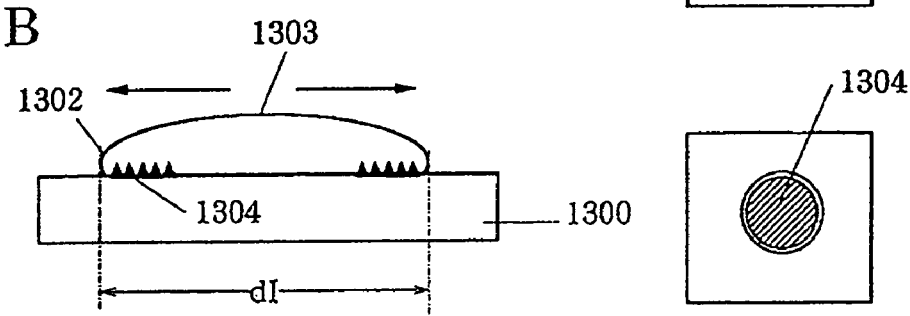
Figure 10C:
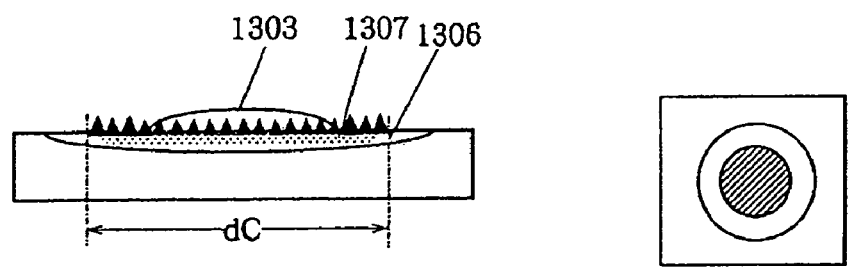
Figure 10D:
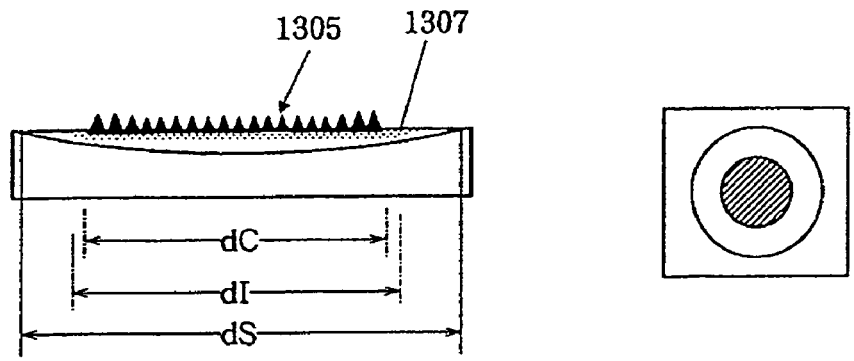

FIGS. 10B to 10D are schematic views showing the state of ink during the period from the impact of the ink on the recording medium 1300 to the fixation of the ink. Paying attention to the state of spreading of an ink dot in this case allows one to consider that the concentration of a poor medium is higher at an outer periphery 1302 of the dot at a portion of contact between the ink and the paper than at a center portion 1303 of the dot. As a result, the ink dot scatters in a nearly complete circle form near the surface of the recording medium, and the concentration of the poor medium 1307 for the water-insoluble coloring material suddenly increases in the course of the scattering. The sudden increase involves the unstabilization of the dispersion of the water-insoluble coloring material to cause the flocculation or dispersion breakage of the water-insoluble coloring material. At this time, the ink dot scatters while taking an edge close to a complete circle form on the surface of the recording medium (see FIG. 10B), and a water-insoluble coloring material 1304 remains on the surface of the recording medium 1300 as if a bank of the water-insoluble coloring material were formed at the outer edge portion of the dot. Thus, the dot of the water-insoluble coloring material is expected to be formed in a complete circle form and fixed in this state on the surface of the recording medium (see FIG. 10C). At this time, the formation of the dot of the water-insoluble coloring material is completed, but the water-soluble organic solvents and water 1306 in the ink spread radially while scattering. In other words, even after the formation of the dot of the water-insoluble coloring material, the water-soluble organic solvents and the water 1306 continue to scatter near the surface of the recording medium. Subsequently, the evaporation or permeation of the water-soluble organic solvent at the good medium-enriched center portion 1303 causes the water-insoluble coloring material to precipitate at the portion to form a dot 1305 (see FIG. 10D). An image formed through such a process as described above has a sufficiently large area factor even with a small amount of ink droplets, has a high image density, and effectively suppresses bleeding so as to be of high quality. In addition, effectively causing a water-insoluble coloring material in cyan ink applied to a recording medium to be present near the surface of the recording medium allows ink having a small coloring material content like the cyan ink according to the present invention to obtain a high image density.

[Color Balance]

The color balance in the present invention refers to the degree of the relative spread of a color reproduction range that can be expressed by each color. Here, the color balance will be described with reference to FIG. 13.

Figure 13:
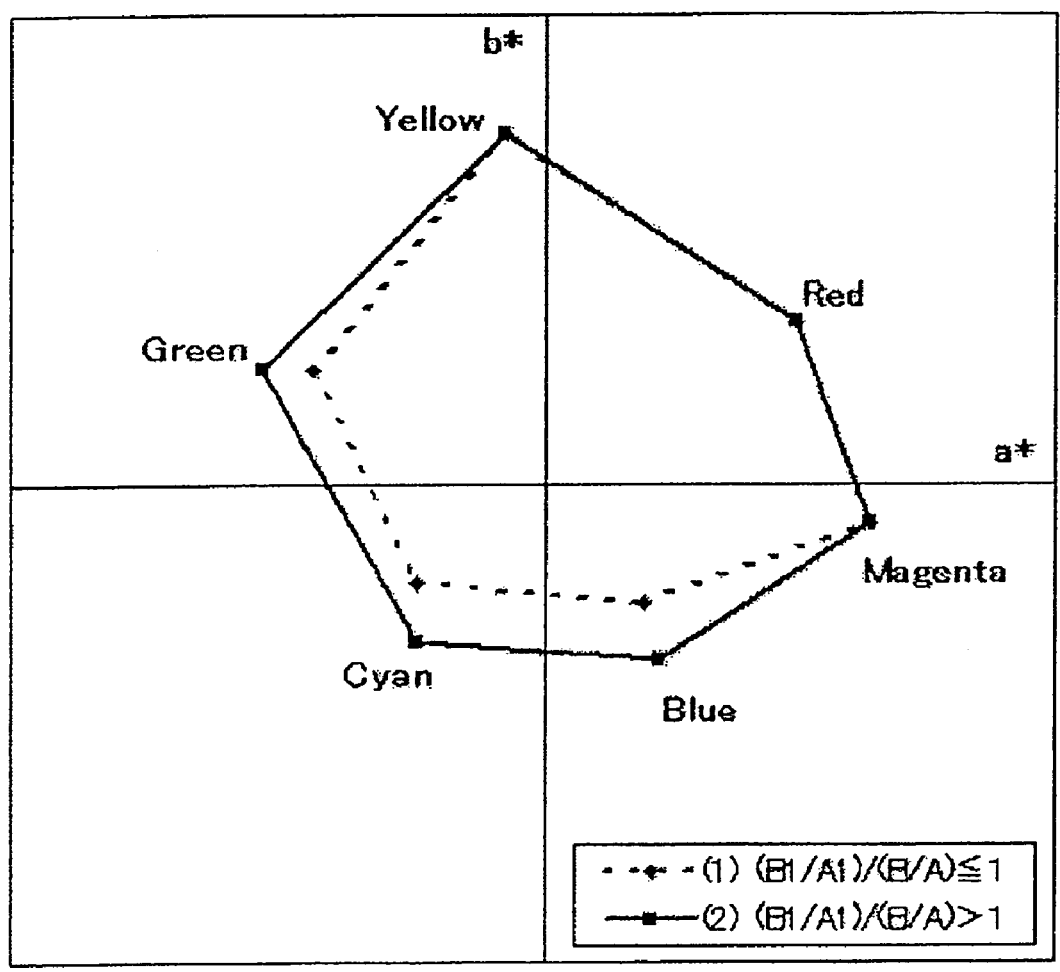
FIG. 13 is a view showing an image of a color reproduction range when an image is formed on a recording medium (plain paper).

FIG. 13 shows the color reproduction range of an a*b* plane in a CIE-Lab space for a recorded product obtained by forming an image on plain paper as a recording medium. In FIG. 13, the color reproduction ranges indicated by (1) are color reproduction ranges when cyan ink that does not correspond to the present invention is used, while the color reproduction ranges indicated by (2) are color reproduction ranges when the cyan ink of the present invention is used. As can be seen from FIG. 13, when the cyan ink of the present invention is used, the color reproduction range of each color (cyan, green, yellow, red, magenta, or blue) shows sufficient coloring property, and a color balance can be said to be excellent. In contrast, when the cyan ink that does not correspond to the present invention is used, the color reproduction range mainly composed of cyan is narrower than any other region, so a color balance can be said to be bad.

As described above, reducing the coloring material content in ink for improving bronzing resistance or a color balance in an image formed on a recording medium having surface gloss involves problems such as reductions in image density and color balance in an image formed on a recording medium such as plain paper.

The inventors of the present invention have made studies in the case where an image is to be formed by means of an ink set having plurality of inks to achieve both suppression of bronzing occurring when an image is to be formed on a recording medium having surface gloss by means of cyan ink as well as improvement of color balance between the cyan ink and any other ink of the ink set. As a result, they have found that the foregoing problems can be solved by: reducing the content of a water-insoluble coloring material in the cyan ink out of the inks constituting the ink set to be lower than the content of a water-insoluble coloring material in any other ink; and increasing the content of a poor medium in the cyan ink to be higher than the content of a poor medium in any other ink, that is, increasing the value of the ratio of the poor medium to the good medium in the cyan ink (B/A) to be higher than that in any other aqueous ink. The mechanism with which the above effect can be obtained is expected to be as follows.

Adjusting the content of the water-insoluble coloring material in the cyan ink out of the inks constituting the ink set to be in the above-mentioned prescribed range causes such a phenomenon as described below to occur. In other words, an image density is low in a recording medium such as plain paper because the content of the water-insoluble coloring material in the cyan ink is small. Meanwhile, bronzing can be suppressed in a recording medium having surface gloss.

Increasing the content of the poor medium in the cyan ink to be higher than the content of the poor medium in any other ink, that is increasing the (B/A) value of the cyan ink causes such a phenomenon as described below to occur. In other words, increasing the content of the poor medium in the cyan ink makes a flocculating action of the poor medium on the water-insoluble coloring material to be more than that of any other ink. Therefore, the water-insoluble coloring material in the cyan ink is present nearer the surface of a recording medium than the water-insoluble coloring material in any other ink. As a result, image density and color balance can be improved even when the content of the water-insoluble coloring material in the cyan ink is small.

The above-described two mechanisms act to achieve a high level of balance between the image performance in a recording medium such as plain paper (the image density and color balance of cyan ink) and the image performance on a recording medium having surface gloss (improvements of bronzing resistance and color balance).

The inventors of the present invention consider the reason by which the above effect can be obtained to be as follows. Here, the mechanism with which the above effect can be obtained will be described with reference to FIGS. 11A, 11B, 11C, and 11D, and FIGS. 12A, 12B, 12C, and 12D. FIGS. 11A, 11B, 11C, and 11D, and FIGS. 12A, 12B, 12C, and 12D each schematically show a state when an ink droplet of the present invention impacts on a recording medium (plain paper). FIGS. 11A, 11B, 11C, and 11D each show the case where aqueous ink has a small (B/A) value, while FIGS. 12A, 12B, 12C, and 12D each show the case where aqueous ink has a large (B/A) value.

The ink permeates into the recording medium in FIGS. 11A, 11B, 11C, and 11D, and FIGS. 12A, 12B, 12C, and 12D with basically the same mechanism as that described above with reference to FIGS. 10A, 10B, 10C, and 10D. Comparison between FIGS. 11A, 11B, 11C, and 11D, and FIGS. 12A, 12B, 12C, and 12D shows that the final position of the water-insoluble coloring material in the ink having a large (B/A) value present at the recording medium is different from the final position of the water-insoluble coloring material in the ink having a small (B/A) value present at the recording medium. That is, as shown in FIGS. 11A, 11B, 11C, and 11D, when the ink has a relatively small (B/A) value, the amount of a poor medium is relatively small during the process from FIG. 11B to FIG. 11C, so a flocculating action on the water-insoluble coloring material is expected to be relatively weak. In contrast, as shown in FIGS. 12A, 12B, 12C, and 12D, when the ink has a relatively large (B/A) value, the amount of a poor medium is relatively large during the process from FIG. 12B to FIG. 12C, so flocculating and precipitating actions on the water-insoluble coloring material are relatively strong, and hence the ratio of the water-insoluble coloring material present nearer the surface of the recording medium is expected to be large.

[Two-Liquid System]

The inventors of the present invention have studied a system in which an ink containing a water-insoluble coloring material and a reaction liquid capable of making the state of dispersion of the coloring material in the ink upon contact with the ink are used to form an image (which may hereinafter be referred to as a two-liquid system).

The conventional two-liquid system intends to obtain an image having a high printing density by allowing a larger amount of coloring material to remain on the surface layer portion of a recording medium. Therefore, an aqueous ink and a reaction liquid are brought into contact with each other immediately after or simultaneously with the application of the aqueous ink and the reaction liquid to a recording medium, thereby determining the reaction. As a result, an area factor may be small although the amount of ink droplets is large.

However, as in the present invention, when the ink of the present invention is applied to a recording medium after the fixation of a reaction liquid to the recording medium has been completed, an image having a sufficiently large area factor even with a small amount of ink droplets, and having a high image density can be obtained. The reason by which the above effect can be obtained is unclear, but the inventors of the present invention consider the reason to be as follows.

Placing a time interval between the application of the reaction liquid to the recording medium and the application of the aqueous ink allows most of the reactive components in the reaction liquid to be present at a slightly permeated position into the depth direction from the surface layer portion of the recording medium rather than at the surface layer portion of the recording medium. Application of the aqueous ink of the present invention to the recording medium in such a state causes the phenomenon shown in FIGS. 10A, 10B, and 10C to occur before the reaction between the water-insoluble coloring material and the reactive components occurs. After that, the remainder of the water-insoluble coloring material present at the slightly permeated position into the depth direction from the surface layer portion of the recording medium suddenly reacts with a large amount of reactive components present at the position permeating slightly into the depth direction from the surface layer portion of the recording medium. Therefore, an image can be obtained, which has a sufficiently large area factor at the surface layer portion of the recording medium; and a high image density as a result of the suppression of the permeation of the water-insoluble coloring material into the depth direction of the recording medium.

On the other hand, when ink that does not correspond to the present invention is applied to a recording medium, it is very difficult to form the flocculate of a water-insoluble coloring material at a desired position unless a balance between the rate of permeation of a liquid medium and the rate of flocculation of the water-insoluble coloring material is contrived. Therefore, when the ink that does not correspond to the present invention is used, bleeding resistance may deteriorate, an area factor may be small for a large amount of ink droplets, or an image having a high image density may not be obtained.

The following has also been found. The ratio of a poor medium to a good medium in each ink except cyan ink in an ink set (specifically, magenta ink, yellow ink, black ink, or the like) is specified as in the case of the cyan ink of the present invention, and the ink set having at least the cyan ink of the present invention, magenta ink, yellow ink, and black ink as well as a reaction liquid are used to form an image, whereby further high image density can be obtained without any impairment to the color balance.

[Method of Determining Good Medium and Poor Medium]

The good medium or the poor medium to be used in the present invention under such assumed mechanism as described above is determined on the basis of whether the dispersed state of a water-insoluble coloring material can be favorably maintained, that is, it is determined according to relations with the water-insoluble coloring material or with the water-insoluble coloring material and a substance that contributes to its dispersion (dispersants, surfactants, etc. as mentioned below). Accordingly, in preparing the aqueous ink according to the present invention, the good medium and the poor medium are preferably selected on the basis of the observation of the degree of stability of the dispersed state of a water-insoluble coloring material to be used. The inventors of the present invention have found that the following determination method is effective as a result of various studies of the criteria for determination of the good medium and the poor medium providing the effects of the present invention in connection with the effects of the present invention.

First, a dispersion solution of the water-insoluble coloring material is prepared which contains 50 mass % of each water-soluble organic solvent to be determined, 45 mass % of water, and 5 mass % of the water-insoluble coloring material to be used for the ink. Then, the prepared dispersion solution is stored at 60° C. for 48 hours. The water-soluble organic solvent is regarded as a poor medium when the average particle size of the water-insoluble coloring material in the liquid is larger than the average particle size of the water-insoluble coloring material in a water dispersion solution containing 5-mass % of the water-insoluble coloring material and 95 mass % of water. The water-soluble organic solvent is regarded as a good medium when the average particle size of the water-insoluble coloring material in the dispersion solution is equal to or smaller than the average particle size of the water-insoluble coloring material in a water dispersion solution containing 5-mass % of the water-insoluble coloring material and 95 mass % of water.

More specifically, determination as to whether a water-soluble organic solvent to be used is a good medium or a poor medium for a certain water-insoluble coloring material is made according to the following method. First, two kinds of dispersion solutions shown below are prepared: a dispersion solution A of a water-insoluble coloring material in a solvent containing the water-soluble organic solvent to be determined, and a water dispersion solution B of the same water-insoluble coloring material.

Dispersion solution A: A water-insoluble coloring material dispersion solution containing 50 mass % of a water-soluble organic solvent to be determined, 5 mass % of a water-insoluble coloring material (or 5 mass % in total of a water-insoluble coloring material and a substance contributing to the dispersion of the coloring material), and 45 mass % of water.

Water dispersion solution B: A water dispersion solution of a water-insoluble coloring material containing 5 mass % of the water-insoluble coloring material (or 5 mass % in total of the water-insoluble coloring material and a substance contributing to the dispersion of the coloring material), and 95 mass % of water.

The dispersion solution A is kept at 60° C. for 48 hours, and cooled to ordinary temperature. The average particle size of the water-insoluble coloring material in the dispersion solution A is measured with a fiber-optics particle analyzer (trade name: FPAR-1000; manufactured by Otsuka Electronics Co., Ltd.) or the like. Meanwhile, the average particle size of the water-insoluble coloring material in the water dispersion solution B that has not been stored under heat is measured with the fiber-optics particle analyzer in the same manner as that described above. The determination as to a good medium or a poor medium in accordance with the following definition by means of the particle size (A) and particle size (B) of the water-insoluble coloring materials in the dispersion solution A and the water dispersion solution B, respectively.

Poor medium: When the particle size (A) is larger than the particle size (B) in the foregoing, the water-soluble organic solvent to be determined is defined as a poor medium.

Good medium: When the particle size (A) is equal to or smaller than the particle size (B), the water-soluble organic solvent to be determined is defined as a good medium.

The preparation of ink having the constitution of the present invention by means of the determined good and poor mediums as described above has been confirmed to provide such excellent effects as described above.

[Ka Value of Water-Soluble Organic Solvent]

In the present invention, the mechanism of image formation described above can be expressed when a water-soluble organic solvent showing the maximum Ka value out of respective Ka values of plurality of water-soluble organic solvents as each determined by the Bristow method is a poor medium in addition to the condition that the water-soluble organic solvents have such a specific constitution as described above.

Here, a Ka value determined by the Bristow method will be described. The value is used as an indication of the permeability of a liquid into a recording medium. Hereinafter, ink will be described as an example. That is, when the permeability of ink is represented by the amount V of the ink per 1 m², the amount of permeation V of the ink into a recording medium (mL/m²=μm) after a predetermined time t from the ejection of an ink droplet is represented by Bristow's equation (Equation (1)) shown below.

$$V=V_r+Ka(t-t_w)^{1/2}$$ Eq. (1)

Immediately after ink has been applied to a recording medium, most of the ink is absorbed by irregularities on the surface of the recording medium (surface roughness portions on the surface of the recording medium), and nearly no ink permeates into the recording medium (depth direction). The time to required for the absorption is a contact time ($t_w$), and the amount of the ink absorbed by the surface roughness portion of the recording medium during the contact time is denoted by $V_r$. Then, after the ink has been applied to the recording medium, an amount of the ink in proportion to the square root of the time exceeding the contact time, that is, ($t-t_w$), to thereby increase the amount of permeation. Ka represents a proportionality factor of the increase, and shows a value in accordance with the rate of permeation. The Ka value can be measured by means of, for example, a dynamic permeability tester for a liquid according to the Bristow method (for example, trade name: dynamic permeability tester S; manufactured by Toyo Seiki Seisaku-Sho, Ltd.).

The Ka value according to the Bristow method in the present invention is a value measured by means of plain paper (for example, PB paper (manufactured by CANON Inc.) to be used for a copying machine utilizing an electrophotographic method, a page printer (laser beam printer), or a printer utilizing an ink-jet recording method, or PPC paper for a copying machine utilizing an electrophotographic method) as a recording medium. The assumed measurement environment is an ordinary office environment such as an environment having a temperature of 20° C. to 25° C. and a humidity of 40% to 60%.

[Aqueous Ink]

A water-soluble organic solvent in the ink components of the cyan ink according to the present invention indispensably have such a constitution as described above in connection with the water-insoluble coloring material to be used. The other constitution may be similar constitution as that of the conventional aqueous ink. The respective components constituting the aqueous ink of the present invention will be described below.

The magenta ink, the yellow ink, and the black ink are not particularly limited as long as each of them contains water, a water-insoluble coloring material, and plurality of water-soluble organic solvents including a good medium or good mediums for the water-insoluble coloring material and a poor medium or poor mediums for the water-insoluble coloring material. The magenta ink, the yellow ink, and the black ink preferably have similar constitution as that of the cyan ink except for the items described below for the respective hues.

<Aqueous Medium>

A aqueous medium constituting the aqueous ink according to the present invention will be described. The aqueous medium is a mixed solvent of water and a water-soluble organic solvent. In the cyan ink of the present invention, the water-soluble organic solvents are determined to be good medium and poor medium for the water-insoluble coloring material according to the method described above. Then, on the basis of the result of determination, water-soluble organic solvents needs to be selected and appropriately blended to prepare ink in such a manner that: at least the good and poor mediums are simultaneously present in the aqueous ink, and the content of each water-soluble organic solvent is in the range specified in the present invention; and a water-soluble organic solvent showing the maximum Ka value out of respective Ka values of the plurality of water-soluble organic solvents as each determined by the Bristow method is the poor medium.

Specific examples of the water-soluble organic solvents include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; N-methyl-2-pyrrolidone; 2-pyrrolidone; and 1,3-dimethyl-2-imidazolidinone. In addition, deionized water is desirably used as water.

In the cyan ink of the present invention, when the water-soluble organic solvents are selected in such a manner that at least the good medium and poor medium are simultaneously present; and a water-soluble organic solvent showing the maximum Ka value is the poor medium, and the ratio B/A is adjusted to be 0.5 or more and 3.0 or less, when A denotes the total content (mass %) of the good medium based on the total mass of the aqueous ink and B denotes the total content (mass %) of the poor medium based on the total mass of the aqueous ink. The cyan ink of the present invention has the ratio B/A of 0.5 or more and 1.0 or less, or more preferably 0.6 or more and 1.0 or less.

Here, the relationship between the ratio B/A of the poor medium to the good medium in the cyan ink and the ratio B/A of the poor medium to the good medium in the aqueous ink of any other color in the ink set will be described. When the ratio of the poor medium to the good medium in the cyan ink of the present invention is denoted by $B_1/A_1$, the ratio $B_1/A_1$ and the ratio B/A in an arbitrary aqueous ink in the ink set except the cyan ink satisfy the following expression (I). The following expression (I) means that the cyan ink of the present invention has the maximum B/A value out of the aqueous inks in the ink set.

$$(B_1/A_1)/(B/A) > 1 \tag{I}$$

According to a preferred embodiment of the present invention, the following expression (I') is preferably satisfied.

$$(B_1/A_1)/(B/A) \geq 1.8 \tag{I'}$$

According to the detailed investigation by the inventors of the present invention, when the content of a good medium in aqueous ink is large, the aqueous ink is excellent in storage stability, but a high image density is hardly obtained when plain paper is used as a recording medium. In addition, when the content of the good medium in the aqueous ink is small, a high image density can be obtained, but the storage stability of the aqueous ink may be insufficient.

In contrast, controlling the ratio of a poor medium to a good medium out of the water-soluble organic solvents in aqueous ink as described above allows one to achieve both the storage stability of the aqueous ink and a high image density. Furthermore, as described above, an effect that cannot be conventionally obtained, that is the realization of an image having a sufficiently large area factor even with a small amount of ink droplets, and having a high image density can be achieved by controlling a Ka value determined by the Bristow method, which is an indication for the permeability into a recording medium, in determining the respective water-soluble organic solvents to be incorporated into ink.

In each of the magenta ink, the yellow ink, and the black ink in the ink set of the present invention except the cyan ink, water-soluble organic solvents are preferably selected in such a manner that at least good medium and poor medium are simultaneously present; and a water-soluble organic solvent showing the maximum Ka value is the poor medium. The ratio B/A is preferably 0.5 or more and 3.0 or less, more preferably 0.5 or more and 1.0 or less, or particularly preferably 0.6 or more and 1.0 or less, when A denotes the total content (mass %) of the good medium based on the total mass of each aqueous ink and B denotes the total content (mass %) of the poor medium based on the total mass of each aqueous ink.

In the case of an ink set containing two or more kinds of inks having the same color, the expression (I) shall apply to the ink having a higher coloring material content. In the case of a recording apparatus that determines the ink to be used depending on a kind of recording medium, more specifically a recording apparatus that has two or more kinds of inks having the same color and uses different inks for a recording medium having surface gloss and plain paper, however, it is needless to say that the ink to be used for printing on the recording medium having surface gloss/the plain paper is the ink applicable to the present invention for the evaluation of the recording medium having surface gloss/the plain paper for performance.

Here, the relationship between the ratio B/A of the poor medium to the good medium in each of the magenta ink, the yellow ink, and the black ink, and the ratio B/A of the poor medium to the good medium in an aqueous ink of any other color in the ink set will be described. When the ratio B/A in the magenta ink is denoted by $B_2/A_2$, the ratio B/A in the yellow ink is denoted by $B_3/A_3$, and the ratio B/A in the black ink is denoted by $B_4/A_4$, the following expressions are preferably satisfied in the aqueous inks of the respective colors.

Magenta Ink $$0.6 \leq (B_2/A_2)/(B_3/A_3) < 1.8 \tag{II}$$

$$0.6 \leq (B_2/A_2)/(B_4/A_4) < 1.8 \tag{III}$$

Yellow Ink $$0.6 \leq (B_3/A_3)/(B_2/A_2) < 1.8 \tag{IV}$$

$$0.6 \leq (B_3/A_3)/(B_4/A_4) < 1.8 \tag{V}$$

Black Ink $$0.6 \leq (B_4/A_4)/(B2/A_2) < 1.8 \quad \text{(VI)}$$

$$0.6 \leq (B_4/A_4)/(B_3/A_3) < 1.8 \quad \text{(VII)}$$

In each of the expressions (II) to (VII), the value on the most left side is particularly preferably 0.8 instead of 0.6. In each of the expressions (II) to (VII), the value on the most right side is particularly preferably 1.3 instead of 1.8.

According to the investigation by the inventors of the present invention, a Ka value in aqueous ink is adjusted to be preferably less than 1.5, or more preferably 0.2 or more and less than 1.5 for additionally improving the quality of a recorded image formed. That is, adjusting a Ka value in aqueous ink allows solid-liquid separation to occur at an early stage of the course of the permeation of the aqueous ink into a recording medium, so a high-quality image with extremely little bleeding can be formed.

The total content (mass %) of the water-soluble organic solvents in the aqueous ink according to the present invention is not particularly limited, but is in the range of preferably 3 mass % to 50 mass %, or more preferably 10 mass % to 35 mass % (both inclusive) based on the total mass of the ink. In addition, the water content (mass %) in the aqueous ink is in the range of preferably 50 mass % to 95 mass % (both inclusive), or more preferably 60 mass % to 90 mass % (both inclusive) based on the total mass of the ink.

The total content (mass %) of the poor medium in the aqueous ink according to the present invention is more preferably 4 mass % or more based on the total mass of the ink for achieving both high image density and storage stability of the ink. The total content (mass %) of the poor medium is preferably 37.5 mass % or less, or more preferably 5 mass % or more and 20 mass % or less based on the total mass of the ink.

<Water-Insoluble Coloring Material>

The water-insoluble coloring material constituting the aqueous ink according to the present invention will be described. The water-insoluble coloring material constituting the aqueous ink of the present invention may be any one irrespective of how it is dispersed. Of those, a pigment is particularly preferably used. To be specific, for example, the pigment may be a pigment of so-called resin-dispersion type using a dispersant or a surfactant (resin-dispersed pigment); a pigment of surfactant-dispersed type; a microcapsule-type pigment with its dispersibility enhanced to enable the dispersion of the pigment without the use of a dispersant or the like; a pigment of so-called self-dispersion type having a hydrophilic group introduced to the surface of a pigment particle (self-dispersion pigment); or a modified pigment having an organic group containing a polymer chemically bonded to the surface of a pigment particle (polymer-bonded self-dispersion pigment). Of course, those pigments to be dispersed in different ways may be used in combination.

The water-insoluble coloring material of the present invention such as the resin-dispersion pigment, the self-dispersion pigment, or the polymer-bonded self-dispersion pigment described above is dispersed in an aqueous medium. That is, it is needless to say that the good medium and poor medium for the water-insoluble coloring material of the present invention refer to good medium and poor medium for the resin-dispersion pigment, the self-dispersion pigment, the polymer-bonded self-dispersion pigment, or the like. Hereinafter, the water-insoluble coloring material that can be used in the present invention will be described.

The content (mass %) of the water-insoluble coloring material in the cyan ink of the present invention is preferably 0.5 mass % or more and 10 mass % or less, more preferably 1 mass % or more and 5 mass % or less, based on the total mass of the cyan ink. The content is further preferably 1.5 mass % or more and 3.5 mass % or less, particularly preferably 1.5 mass % or more and 3.0 mass % or less.

The content (mass %) of the water-insoluble coloring material in any aqueous ink except the cyan ink is not particularly limited, but is in the range of preferably 0.1 mass % to 15 mass % (both inclusive), more preferably 1.8 mass % to 8 mass % (both inclusive), or particularly preferably 2 mass % to 6.5 mass % (both inclusive) based on the total mass of the aqueous ink.

In addition the content of the water-insoluble coloring material in the cyan ink is smaller than that in other aqueous inks than the cyan ink.

(Pigment)

The pigment that can be used in the aqueous ink according to the present invention is not particularly limited, and any one of those described below can be used.

Carbon black is suitably used for black ink. For example, any one of furnace black, lamp black, acetylene black, and channel black can be used as carbon black. Specific examples of carbon black include commercially available products such as: Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, and Raven 1255 (manufactured by Columbian Chemicals Co.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, and Vulcan XC-72R (manufactured by Cabot Corporation); Color Black FW1, Color Black FW2, Color Black FW2V, Color Black FW18, Color Black FW200, Color Black S150, Color Black S160, Color Black S176, Printex 35, Printex U, Printex V, Printex 140U, Printex 140V, Special Black 6, Special Black 5, Special Black 4A, and Special Black 4 (manufactured by Degussa Corporation); and No. 25, No. 33, No. 40, No. 47, No. 52, No. 900, No. 2300, MCF-88, MA600, MA7, MA8, and MA100 (manufactured by Mitsubishi Chemical Corporation). Carbon black newly prepared for the present invention may also be used. However, the present invention is not limited to them. Any conventionally known carbon black may be used. Magnetic fine particles made of magnetite, ferrite, or the like, titanium black, or the like may be used as the black pigment instead of carbon black.

Examples of pigment particles to be used except the black ink include various organic pigment particles. Specific examples of the organic pigments include: insoluble azo pigments such as toluidine red, toluidine maroon, Hansa yellow, benzidine yellow, and pyrazolone red; soluble azo pigments such as lithol red, hello bordeaux, pigment scarlet, and permanent red 2B; derivatives of vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; diketopyrrolopyrrole-based pigments; flavanthrone yellow; acylamide yellow; quinophthalone yellow; nickel azo yellow; copper azo methine yellow; perinone orange; anthrone orange; dianthraquinonyl red; and dioxazine violet. Of course, the present invention is not limited to them, and any other organic pigment may be used.

Further, examples of the organic pigment represented by a color index (C.I.) number include the following.

C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185

C.I. Pigment Orange 16, 36, 43, 51, 55, 59, 61, and 71

C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272

C.I. Pigment Violet 19, 23, 29, 30, 37, 40, and 50

C.I. Pigment Blue 15, 15:1, 15:3, 15:4, 15:6, 22, 60, and 64

C.I. Pigment Green 7 and 36

C.I. Pigment Brown 23, 25, and 26

(Resin-Dispersion Pigment)

As described above, a resin-dispersion pigment using a dispersant can be used as the water-insoluble coloring material that can be used in the aqueous ink according to the present invention. In this case, a compound such as a surfactant or a resin dispersant for dispersing such a hydrophobic pigment as described above is required.

An anionic surfactant or a nonionic surfactant is a preferable surfactant. Specific examples of the anionic surfactant include a fatty acid salt, an alkyl sulfate, an alkyl benzenesulfonate, an alkyl naphthalenesulfonate, a dialkyl sulfosuccinate, an alkyl phosphate, a formalin condensate of naphthalenesulfonic acid, a polyoxyethylene alkyl sulfate, and substituted derivatives thereof. Specific examples of the nonionic surfactant include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene alkylamine, a glycerin fatty acid ester, an oxyethylene oxypropylene block polymer, and substituted derivatives thereof.

Specific examples of the resin dispersant include (1) block copolymers, random copolymers, and graft copolymers each composed of at least two monomers (at least one of which is a hydrophilic monomer) selected from: styrene and a derivative thereof; vinyl naphthalene and a derivative thereof; a fatty acid alcohol ester of α,β-ethylenically unsaturated carboxylic acid; acrylic acid and a derivative thereof; maleic acid and a derivative thereof; itaconic acid and a derivative thereof; fumaric acid and a derivative thereof; and vinyl acetate, vinyl alcohol, vinyl pyrrolidone, and acrylamide, and derivatives thereof, and (2) salts of the copolymers. Furthermore, for example, a block copolymer and a random copolymer may be used in combination.

(Microcapsule-Type Pigment)

As described above, a microcapsule-type pigment obtained by coating a water-insoluble coloring material with an organic polymer or the like to prepare a microcapsule can be used as the water-insoluble coloring material that can be used in the aqueous ink according to the present invention. Examples of a method of coating a water-insoluble coloring material with an organic polymer or the like to prepare a microcapsule include a chemical production method, a physical production method, a physicochemical method, and a mechanical production method. Specific examples thereof include an interfacial polymerization method, an in-situ polymerization method, a submerged cure coating method, a coacervation (phase separation) method, a submerged drying method, a melting dispersion cooling method, an aerial suspension coating method, a spray drying method, an acid precipitation method, and a phase inversion emulsification method.

Specific examples of the organic polymer or the like to be used as a material constituting the wall membrane substance of a microcapsule include: polyamide; polyurethane; polyester; polyurea; an epoxy resin; polycarbonate; a urea resin; a melamine resin; a phenol resin; polysaccharides; gelatin; gum arabic; dextran; casein; protein; natural rubber; carboxypolymethylene; polyvinyl alcohol; polyvinyl pyrrolidone; polyvinyl acetate; polyvinyl chloride; polyvinylidene chloride; cellulose; ethylcellulose; methylcellulose; nitrocellulose; hydroxyethylcellulose; cellulose acetate; polyethylene; polystyrene; a polymer or copolymer of (meth)acrylic acid; a polymer or copolymer of (meth)acrylate; a (meth)acrylic acid-(meth)acrylate copolymer; a styrene-(meth)acrylic acid copolymer; a styrene-maleic acid copolymer; soda alginate; a fatty acid; paraffin; beeswax; water wax; hardened beef tallow; carnauba wax; and albumin. Of those, an organic polymer or the like having an anionic group such as a carboxylic group or a sulfonic group is preferable. Specific examples of a nonionic organic polymer include: polyvinyl alcohol, polyethylene glycol monomethacrylate, polypropylene glycol monomethacrylate, and methoxypolyethylene glycol monomethacrylate, and (co)polymers of them; and a cation ring-opening polymer of 2-oxazoline. A completely saponified product of polyvinyl alcohol is particularly preferable because it has low water solubility and is easily soluble in hot water but is hardly soluble in cold water.

When a phase inversion method or an acid precipitation method is used for preparing a microcapsule, an anionic organic polymer or the like is used as an organic polymer or the like constituting the wall membrane substance of the microcapsule.

The phase inversion method involves: turning a composite or complex of an anionic organic polymer or the like having self dispersibility or solubility in water and a coloring material such as a self-dispersion organic pigment or self-dispersion carbon black, or a mixture of a coloring material such as a self-dispersion organic pigment or self-dispersion carbon black, a curing agent, and an anionic organic polymer or the like, into an organic solvent phase; adding water to the organic solvent phase (or adding the organic solvent phase to water); and turning the mixture into a microcapsule while subjecting the mixture to self dispersion (phase inversion emulsification). The phase inversion method may involve mixing the organic solvent phase with a water-soluble organic solvent or an additive to be used for ink. In particular, an aqueous medium of ink is preferably mixed because a dispersion solution for the ink can be directly produced.

The acid precipitation method includes the steps of: neutralizing in whole or in part an anionic groups of an organic polymer or the like having the anionic groups with a basic compound; kneading the resultant with a coloring material such as a self-dispersion organic pigment or self-dispersion carbon black in an aqueous medium; adjusting the pH with the acid compound to be a neutral or acidic one to precipitate an anionic-group-containing organic polymer or the like; fixing the organic polymer or the like to a pigment to produce a water-containing cake; and neutralizing in whole or in part the anionic groups of the water-containing cake with a basic compound to prepare a microcapsule. The acid precipitation method allows a fine anionic microencapsulated pigment containing a large amount of pigment to be produced.

Specific examples of such an organic solvent as described above to be used for microencapsulation include: alkyl alcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane; and cellosolves such as methyl cellosolve and butyl cellosolve.

The microcapsules prepared according to the above method may be separated from organic solvents for them through centrifugation, filtration, or the like and stirred with water and a required solvent for re-dispersion to prepare a target microcapsule-type pigment. The average particle size of the microcapsule-type pigment to be obtained according to such a method as described above is preferably 50 nm to 180 nm.

(Self-Dispersion Pigment)

As described above, a self-dispersion pigment with its dispersibility enhanced to enable the dispersion of the pigment without the use of a dispersant or the like may be used as the water-insoluble coloring material that can be used in the aqueous ink according to the present invention. The self-dispersion pigment preferably has a hydrophilic group chemically bonded to the surface of a pigment particle either directly or via any other atomic group. For example, a self-dispersion pigment having a hydrophilic group selected from the group consisting of —COOM1, —SO$_3$M1, and —PO$_3$H(M1)$_2$ (M1 in the formulae represents a hydrogen atom, an alkali metal, ammonium, or an organic ammonium) introduced to the surface of a pigment particle can be suitably used. The other atomic group is preferably an alkylene group having 1 to 12 carbon atoms, a substituted or unsubstituted phenylene group, or a substituted or unsubstituted naphthylene group. A self-dispersion pigment with its surface oxidized can also be suitably used, which is obtained by means of, for example, a method involving oxidizing carbon black with soda hypochlorite, a method involving oxidizing carbon black through a submerged ozone treatment, or a method involving performing an ozone treatment and subjecting carbon black to wet oxidation to modify the surface of carbon black.

(Polymer-Bonded Self-Dispersion Pigment)

As described above, a polymer-bonded self-dispersion pigment with its dispersibility enhanced to enable the dispersion of the pigment without the use of a dispersant or the like may be used as the water-insoluble coloring material that can be used in the aqueous ink according to the present invention. The polymer-bonded self-dispersion pigment preferably contains a reaction product of a functional group chemically bonded to the surface of the pigment either directly or via any other atomic group and a copolymer of an ionic monomer and a hydrophobic monomer. This is because the copolymerization ratio between the ionic monomer and the hydrophobic monomer as materials for forming a copolymer to be used for modifying the surface of the pigment can be appropriately changed, and the change allows the hydrophilicity of the modified pigment to be appropriately adjusted. Various properties can also be imparted to the surface of the pigment because the kinds of ionic and hydrophobic monomers to be used and the combination of the monomers can be appropriately changed.

[Functional Group]

A functional group of the polymer-bonded self-dispersion pigment is chemically bonded to the surface of the pigment either directly or via any other atomic group. The functional group intends to constitute an organic group through a reaction with a copolymer to be described later, and the kind of the functional group is selected in connection with a functional group carried on the copolymer. The reaction between the functional group and the copolymer is preferably a reaction producing a bond that does not cause hydrolysis or the like such as an amide bond in consideration of the condition that the pigment is dispersed into an aqueous medium. To this end, an amino group is used as the functional group and the copolymer is allowed to carry a carboxyl group. Thus, the copolymer can be introduced to the surface of a pigment particle via an amide bond. Alternatively, a carboxyl group is used as the functional group and the copolymer is allowed to carry an amino group. Thus, the copolymer can be introduced to the surface of a pigment particle via an amide bond as described above.

The functional group may be chemically bonded to the surface of the pigment either directly or via any other atomic group. However, when a copolymer having a relatively large molecular weight is to be introduced to the surface of the pigment, the functional group is preferably introduced to the surface of the pigment via any other atomic group in order to prevent steric hindrance between copolymers. The other atomic group is not particularly limited as long as it is a polyvalent element or an organic group. However, by reason of the foregoing, for example, a divalent organic residue is preferably used from the viewpoint of control of a distance between the functional group and the surface of the pigment. Specific examples of the divalent organic residue include an alkylene group and an arylene (phenylene) group.

More specifically, in, for example, each example to be described later, a pigment is allowed to react with aminophenyl(2-sulfoethyl)sulfone to introduce an aminophenyl(2-sulfoethyl)sulfone group to the surface of the pigment, and then an amino group of pentaethylene hexamine and the aminophenyl(2-sulfoethyl)sulfone group are allowed to react with each other to introduce an amino group as a functional group. In this case, the amino group is chemically bonded to the surface of the pigment via an atomic group containing a phenyl(2-sulfoethyl) group. Of course, the present invention is not limited thereto.

[Copolymer]

A copolymer of an ionic monomer and a hydrophobic monomer is preferably, for example, an anionic copolymer having anionic property or a cationic copolymer having cationic property.

Examples of the anionic copolymer include a copolymer of a hydrophobic monomer and an anionic monomer, and a salt of the copolymer.

Specific examples of the hydrophobic monomer include: styrene; vinyl naphthalene; alkyl methacrylates such as methyl methacrylate; alkyl acrylates such as phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbil methacrylate, and methyl acrylate; phenyl acrylate; benzyl acrylate; acrylonitrile; 2-trimethylsiloxyethyl acrylate; glycidyl acrylate; p-tolyl acrylate; and sorbil acrylate. Specific examples of the anionic monomer include acrylic acid, methacrylic acid, and maleic acid. Of course, the present invention is not limited thereto.

An anionic copolymer of an anionic monomer and a hydrophobic monomer is composed of at least two monomers including any one selected from the hydrophobic monomers listed above and at least one selected from the anionic monomers listed above. Examples of the anionic copolymer include a block copolymer, a random copolymer, a graft copolymer, and salts of the copolymers.

Such anionic copolymer preferably has an acid value in the range of 100 to 500, and the acid values of the copolymer are preferably in the range of the average acid value ±20% (both inclusive). When an acid value is higher than the above range, the hydrophilicity of the surface of the pigment becomes excessively high, so water and a solvent in the ink after printing may remain on the surface of the pigment to retard the expression of abrasion resistance after the printing on a recording medium. When an acid value is lower than the above range, the hydrophilicity of the surface of the pigment becomes excessively low, so the pigment may be hardly dispersed into the ink in a stable manner.

Examples of the salt of the anionic copolymer include: alkali metal (such as sodium, lithium, or potassium) salts; ammonium salts; alkylamine salts; and alkanolamine salts. Each of them may be used alone, or two or more of them may be appropriately used in combination.

Examples of the cationic copolymer include a copolymer of a hydrophobic monomer and a cationic monomer, and a salt of the copolymer.

Any one of the monomers listed above can be used as the hydrophobic monomer. Specific examples of the cationic monomer include allylamine, dimethylaminoethyl methacrylate, diethylaminoethyl methacrylate, tert-butylaminoethyl methacrylate, dimethylaminoethyl acrylate, diethylaminoethyl acrylate, dimethylaminopropyl methacrylamide, N-vinylcarbazole, methacrylamide, acrylamide, and dimethylacrylamide. Of course, the present invention is not limited thereto.

An cationic copolymer of a cationic monomer and a hydrophobic monomer is composed of at least two monomers including any one selected from the hydrophobic monomers listed above and at least one selected from the cationic monomers listed above. Examples of the cationic copolymer include a block copolymer, a random copolymer, a graft copolymer, and salts of the copolymers.

Such cationic copolymer preferably has an amine value in the range of 100 to 500, and the amine values of the copolymer are preferably in the range of the average amine value ±20% (both inclusive). The amine value is determined by neutralizing 1 g of a sample and representing the amount required for the neutralization in KOH mg in correspondence with an acid value.

Examples of the salt of the cationic copolymer include acetic acid, hydrochloric acid, and nitric acid. Each of them may be used alone, or two or more of them may be appropriately used in combination.

The anionic or cationic copolymer described above has a weight average molecular weight (Mw) in the range of preferably 1,000 to 20,000, or more preferably 3,000 to 20,000. The polydispersity index (Mw/Mn) (where Mw represents a weight average molecular weight and Mn represents a number average molecular weight) of a cationic copolymer segment is preferably 3 or less. The content of the mass of such anionic or cationic copolymer is preferably 5% or more and 40% or less based on the mass of the pigment particles with their surfaces denatured with the copolymer. In addition, the molecular weight distribution of a copolymer is preferably uniform because, when the copolymer has a large polydispersity index, the molecular weight distribution of the copolymer broadens, and hence the above-described properties based on the molecular weight of the copolymer are hardly expressed.

Next, a method involving chemically bonding an organic group to the surface of a pigment particle to modify a pigment will be described by taking carbon black as an example. The method to be used at this time may be any one of the generally used methods without any particular limitation as long as the method involves: introducing a functional group to the surface of a pigment particle; and bonding a copolymer composed of an ionic monomer and a hydrophobic monomer to the functional group to chemically bond the copolymer to the surface of the pigment particle.

Specifically, for example, each of the following methods can be used as such method. A method involving: introducing polyethyleneimine or the like to the surface of a pigment particle such as carbon black; and bonding, to the terminal functional group, a copolymer composed of an ionic monomer and a hydrophobic monomer, the copolymer having an amino group, through a diazonium reaction, and a method involving bonding, to the surface of a pigment particle such as carbon black, a copolymer having an amino group and a carboxyl group in a molecule through a diazonium reaction can be used. The most typical example out of the other methods is disclosed in WO 01/51566 A1.

For example, when an anionic copolymer is chemically bonded to the surface of a carbon black particle in the above method, the following three steps are performed.

First step; A step of adding an aminophenyl(2-sulfoethyl) sulfone group (APSES) to carbon black through a diazonium reaction.

Second step; A step of adding polyethyleneimine or pentaethylene hexamine (PEHA) to carbon black treated with APSES.

Third step; A step of bonding a copolymer of a hydrophobic monomer and an ionic monomer having a carboxyl group.

In the second step, the phenyl(2-sulfoethyl)sulfone group chemically bonded to the carbon black surface in the first step and an amino group of PEHA are allowed to react with each other to introduce an amino group as a functional group chemically bonded to the carbon black surface. In the third step, for example, part of the carboxyl groups of the ionic monomer portion of the copolymer are allowed to react with amino groups to form amide bonds, whereby the copolymer can be introduced to the carbon black surface via an atomic group containing a phenyl(2-sulfoethyl) group as a residue of APSES and a residue of PEHA.

For example, when a cationic copolymer is chemically bonded to the surface of a carbon black particle in the above method, the following two steps must be performed.

First step; A step of adding an aminophenyl(2-sulfoethyl) sulfone group (APSES) to carbon black through a diazonium reaction.

Second step; A step of bonding a copolymer of a hydrophobic monomer and a cationic monomer.

In the first step, a sulfone group is introduced as a functional group chemically bonded to the carbon black surface.; In the second step, for example, part of the amino groups of the ionic monomer portion of the copolymer are allowed to react with sulfone groups (nucleophilic substitution) to introduce the copolymer to the carbon black surface via an atomic group containing a phenyl(2-sulfoethyl) group as a residue of APSES.

<Other Components>

For maintaining moisture retention, the aqueous ink according to the present invention may use a moisture-retaining solid content such as urea, a urea derivative, trimethylolpropane, or trimethylolethane as an ink component as well as the above components. The content of the moisture-retaining solid content such as urea, a urea derivative, or trimethylolpropane in the aqueous ink is generally in the range of 0.1 mass % to 20.0 mass % (both inclusive), or more preferably 3.0 mass % to 10.0 mass % (both inclusive) based on the total mass of the aqueous ink.

The aqueous ink according to the present invention may contain any one of various additives. such as a surfactant, a pH adjustor, a rust inhibitor, an antiseptic, a mildewproofing agent, an antioxidant, an antireducing agent, an evaporation accelerator, and a chelating agent as required as well as the above components.

The aqueous ink according to the present invention is preferably added with a nonionic surfactant for adjusting a surface tension and for improving ejection property. Specific examples of the nonionic surfactant include the compounds each having a structure represented by any one of the following structural formulae (1) to (4).

Structural formula (1)

(In the structural formula (1), R represents an alkyl group and n represents an integer.)

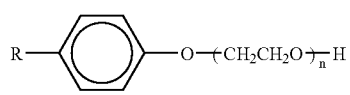

Structural formula (2)

(In the structural formula (2), R represents an alkyl group and n represents an integer.)

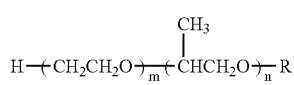

Structural formula (3)

(In the structural formula (3), R represents a hydrogen atom or an alkyl group, and m and n each represent an integer.)

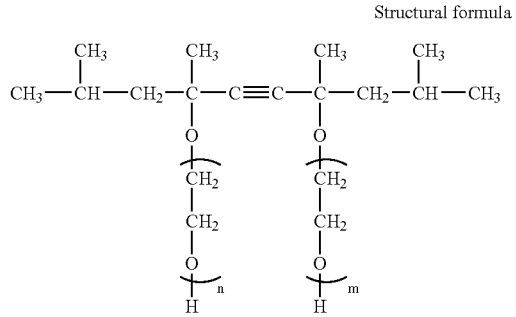

Structural formula (4)

(In the structural formula (4), m and n each represent an integer.)

In the structural formula (1), R preferably represents a linear or branched alkyl group having 8 to 21 carbon atoms, and n preferably represents an integer of 5 to 40. A mixture of two or more kinds of compounds different from each other in R and/or n may be used.

In the structural formula (2), R preferably represents a linear or branched alkyl group having 8 to 21 carbon atoms, and n preferably represents an integer of 5 to 40. A mixture of two or more kinds of compounds different from each other in R and/or n may be used.

In the structural formula (3), m preferably represents an integer of 1 to 10, and n preferably represents an integer of 1 to 10. It should be noted that m represents the number of ethylene oxide units and n represents the number of propylene oxide units. The compound represented by the structural formula (3) may be any one of a block copolymer, an alternating copolymer, and a random copolymer. A mixture of two or more kinds of compounds different from each other in m and/or n may be used.

In the structural formula (4), m preferably represents an integer of 1 to 10, and n preferably represents an integer of 1 to 10. A mixture of two or more kinds of compounds different from each other in m and/or n may be used.

The content of the compound having a structure represented by any one of the structural formulae (1) to (4) in the aqueous ink is in the range of preferably 0.05 mass % to 5 mass % (both inclusive), or more preferably 0.1 mass % to 2 mass % (both inclusive) based on the total mass of the aqueous ink.

<Physical Properties of Ink>

The aqueous ink to be used in the present invention composed of such components as described above preferably has properties with which the ink can be favorably ejected from an ink-jet recording head. The ink preferably has properties including a viscosity of 1 mPa·s to 15 mPa·s (both inclusive) (particularly preferably 1 mPa·s to 5 mPa·s (both inclusive)) and a surface tension of 25 mN/m (dyne/cm) or more (particularly preferably 25 mN/m (dyne/cm) to 50 mN/m (dyne/cm) (both inclusive)) from the viewpoint of ejection property from an ink-jet recording head.

[Reaction Liquid]

A reaction liquid to be used in the present invention contains a reactive component to make the state of dispersion of a water-insoluble coloring material in ink unstable or make the water-insoluble coloring material flocculate. The reactive component reduces the dispersion stability of a water-insoluble coloring material and flocculates the water-insoluble coloring material when an ink prepared by dispersing or dissolving the water-insoluble coloring material into an aqueous medium by virtue of an action of a hydrophilic group and the reaction liquid are brought into contact with each other on a recording medium. The phrase "the dispersed state of a coloring material in an ink is destabilized" as used herein refers to the condition that flocculation or gelation occurs when the ink and the reaction liquid are mixed.

Specific examples of the reactive component include metal salts (especially ions and salts of polyvalent metals), low-molecular-weight cationic compounds, and cationic polymers. Hereinafter, the reactive component will be described.

(Polyvalent Metal Ions and Salts Thereof)

Specific examples of a polyvalent metal ion include: divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Al^{3+}$, $Fe^{3+}$, $Cr^{3+}$, and $Y^{3+}$. An example of a method of incorporating the polyvalent metal ion into a reaction liquid includes a method involving adding a polyvalent metal salt to the reaction liquid. The salt refers to a metal salt composed of each of the polyvalent metal ions listed above and an anion bonded to the polyvalent metal ion; provided, however, that the salt needs to be soluble in water. Examples of a preferable anion for forming a salt include $Cl^-$, $NO_3^-$, $I^-$, $Br^-$, $ClO_3^-$, $SO_4^{2-}$, $CO_3^{2-}$, $CH_3COO^-$, and $HCOO^-$. Of course, the present invention is not limited thereto. In the present invention, the polyvalent metal ion is preferably $Ca^{2+}$, $Mg^{2+}$, $Sr^{2+}$, $Al^{3+}$, or $Y^{3+}$ in terms of, for example, reactivity between the ink and the reaction liquid, coloring property, and the ease of handling of the reaction liquid, and is particularly preferably $Ca^{2+}$. The anion is particularly preferably $NO_3^-$ in terms of solubility and the like.

The content of the polyvalent metal ion in the reaction liquid is preferably 0.01 mass % or more and 10 mass % or less, or more preferably 1.0 mass % or more and 5 mass % or less based on the total mass of the reaction liquid in consideration of the effects according to the present invention. In particular, the content of the polyvalent metal ion is 2.0 mass % or more and 4.0 mass % or less based on the total mass of the reaction liquid for sufficiently exerting a function of unstabilizing the dispersed state of the water-insoluble coloring material in the aqueous ink to obtain a high level of image density. The content of the polyvalent metal ion in the reaction liquid may exceed 10 mass %. However, in general, there is no need to incorporate an excessive amount of polyvalent metal ion partly because a significant improvement of the function of unstabilizing the dispersed state of the water-insoluble coloring material cannot be expected from a content in excess of 10 mass %.

It is preferable that the reaction liquid contains no coloring material and be transparent; provided, however, that the reaction liquid does not need to show absorption in a visible range. That is, the reaction liquid may show absorption in the visible range as long as the reaction liquid has substantially no influences on an image.

(Means for Applying Reaction Liquid to Recording Medium)

Examples of a method of applying a reaction liquid to a recording medium include application methods such as a roller coating method, a bar coating method, and a spray coating method. An application method is also applicable, which involves the use of an ink-jet recording method as in the case of ink to cause a reaction liquid to selectively adhere to only an image forming region to which the ink adheres and the vicinity of the image forming region. As a result of the investigation by the inventors of the present invention on a method of applying a reaction liquid to a recording medium, the inventors have found that the roller coating method is the most excellent. This is because, even when the amount of a reaction liquid to be applied is small, the distributed state of a reactive component near the surface layer portion of a recording medium is more uniform than that in the case of any other means, and image quality such as a reduction in unevenness at a solid print portion after the application of ink or in strike-through is excellent.

A system for forming an image by means of two liquids may use any one of various methods of bringing a reaction liquid and an ink into contact with each other on a recording medium. Examples of the methods include a method involving bringing a reaction liquid and an ink both in liquid states into contact with each other on a recording medium and a method involving: fixing a reaction liquid to a recording medium (that is, causing the recording medium to absorb a droplet of the reaction liquid therein); and bringing the reaction liquid and the ink into contact with each other. In the course of the investigation into a two-liquid system, the inventors of the present invention have concluded that a method involving: fixing a reaction liquid to a recording medium; and applying an ink to the recording medium is most excellent for obtaining a sufficient area factor even with a small amount of droplets while maintaining a high image density.

The term "time at which fixation is complete" as used herein refers to the time at which the value of $Ka(t-t_w)^{1/2}$ represented by Bristow's equation becomes larger than the amount of a reaction liquid actually applied to a recording medium. The time also means the time at which a droplet of the reaction liquid is absorbed by the recording medium, and means t seconds calculated from the Ka value determined by the Bristow method and the amount of a liquid composition applied.

(Physical Properties and Application Amount of Reaction Liquid)

The Ka value determined by the Bristow method representing the permeability of a reaction liquid into a recording medium is preferably 1.3 $mL \cdot m^{-2} \cdot msec^{-1/2}$ or more and 6.0 $mL \cdot m^{-2} \cdot msec^{-1/2}$ or less, or more preferably more than 3.0 $mL \cdot m^{-2} \cdot msec^{-1/2}$ and 6.0 $mL \cdot m^{-2} \cdot msec^{31\ 1/2}$ or less. The application amount of the reaction liquid is preferably 0.5 $g/m^2$ or more and 5 $g/m^2$ or less, or more preferably more than 2.0 $g/m^2$ and 3.0 $g/m^2$ or less.

When the roller coating method is used for applying a reaction liquid, the reaction liquid preferably has physical properties including a viscosity of 1 mpa·s to 100 mPa·s (both inclusive) (more preferably 4 mPa·s to 40 mPa·s (both inclusive)) and a surface tension of 15 mN/m (dyne/cm) to 45 mN/m (dyne/cm) (both inclusive) from the viewpoint of application stability. The amount of an application liquid to be applied or the like can be appropriately adjusted in accordance with, for example, the physical properties of the reaction liquid, the rotating speed of a roller used for an applying apparatus, and the pressure at which the roller is brought into contact with a recording medium.

When an ink-jet method is used for applying a reaction liquid, the reaction liquid preferably has physical properties including a viscosity of 1 mPa·s to 15 mPa·s (both inclusive) and a surface tension of 25 mN/m (dyne/cm) to 50 mN/m (dyne/cm) (both inclusive) from the viewpoint of the ejection property from a recording head. It should be noted that the reaction liquid needs to be allowed to react with only specific aqueous ink, so the reaction liquid must be prevented from bleeding to a portion different from a recording portion by the specific aqueous ink. Therefore, the surface tension of the reaction liquid is preferably larger than that of an aqueous ink containing a water-insoluble coloring material whose dispersed state is to be destabilized by the reaction liquid to such an extent that the reaction liquid can be ejected from a recording head.

[Ink Set]

The cyan ink of the present invention is preferably combined with magenta ink, yellow ink, and black ink, each of which contains: water; a water-insoluble coloring material; and plurality of water-soluble organic solvents including a good medium or good mediums for the water-insoluble coloring material and a poor medium or poor mediums for the water-insoluble coloring material, to prepare an ink set having four kinds of aqueous inks.

The term "ink set" as used herein may refer to any one of the forms described below as long as plurality of inks is combined. Examples of the ink set include: an ink set constituted by an ink tank having tanks each storing cyan ink, magenta ink, yellow ink, or black ink integrated with each other or by an ink tank with a head; an ink set constituted by an ink tank having tanks each storing cyan ink, magenta ink, or yellow ink integrated with each other or by an ink tank with a head; and an ink set having individual ink tanks storing such inks as described above detachably attached to a recording apparatus. In any case, in the present invention, the properties of the single ink of the present invention are specified relative to any other ink to be used (in a recording apparatus or as an ink tank). In addition to the forms described above, any modified form is also applicable.

The ink set may also be used for an image forming method including the steps of: applying an aqueous ink to a recording medium; and applying, to the recording medium, a reaction liquid capable of making the state of dispersion of a water-insoluble coloring material in the aqueous ink unstable on contact with the aqueous ink. In this case, a set of aqueous ink and a reaction liquid capable of making the state of dispersion of a water-insoluble coloring material in the aqueous ink unstable on contact with the aqueous ink is more preferable.

[Ink-Jet Recording Method, Recording Unit, Cartridge, and Ink-Jet Recording Apparatus]

Next, an example of an ink-jet recording apparatus suitable for the present invention will be described below.

FIG. 1 shows a partial sectional view of an example of an ink-jet recording apparatus. A two-liquid system is also applicable to the ink-jet recording apparatus. The ink-jet recording apparatus employs a serial-type ink-jet recording method and includes: a recording head 1; a sheet-feeding cassette 16; drive means for allowing the recording head to move back and forth in the direction perpendicular to the conveying direction of recording paper; and control means for controlling the drive of the components. The sheet-feeding cassette 16 has a sheet-feeding tray 17 for feeding a recording medium (which may hereinafter be referred to as recording paper) 19 and means for applying the reaction liquid described above to the recording medium, the tray and the applying means being integrally formed. The reaction liquid is applied in a uniform and adjusted amount to the recording paper 19 fed from the sheet-feeding tray 17. The means for applying the reaction liquid will be described later.

The recording head 1 is mounted on a carriage 2 in such a manner that a surface having ink ejection orifices formed thereon faces a platen 11. Although not shown, the recording head 1 includes: the ink ejection orifices; plurality of electrothermal converters (such as heat elements) to heat an ink liquid; and a substrate supporting them. The recording head 1 has an ink cartridge installed in a carriage placed in the upper part thereof.

The carriage 2 has the recording head 1 mounted thereon, and can move back and forth along two guide shafts 9 extending in parallel along the width direction of the recording paper 19. In addition, the recording head 1 is driven to eject ink droplets to the recording paper 19 in synchronization with the reciprocating motion of the carriage 2 to form an image. The sheet-feeding cassette 16 is detachable from a main body of the ink-jet recording apparatus. The sheets of the recording paper 19 are stacked on the sheet-feeding tray 17 in the sheet-feeding cassette 16. During sheet feeding, the uppermost sheet is pressed against a sheet-feeding roller 10 by a spring 18 for pressing the sheet-feeding tray 17 upward. The sheet-feeding roller 10 has an almost semicircle cross section, and is rotated by a motor (not shown) to feed only the uppermost sheet (recording paper 19) with a separation claw (not shown).

The separately fed recording paper 19 is conveyed along a convey surface 16A of the sheet-feeding cassette 16 and a convey surface 27A of a paper guide 27 by a large diameter intermediate roller 12 and a small diameter applying roller 6 pressed against the intermediate roller 12. Those convey surfaces are curved in an arc concentric with the intermediate roller 12. Thus, the fed recording paper 19 is conveyed along those convey surfaces 16A and 27A to reverse its conveying direction. That is, the printing surface of the recording paper 19 faces downward until the recording paper 19 is conveyed from the sheet-feeding tray 17 and reaches the intermediate roller 12, but faces upward (recording head side) when the recording paper 19 faces the recording head 1. Thus, the printing surface of the recording paper always faces outward from the ink-jet recording apparatus.

The means for applying the reaction liquid is arranged in the sheet-feeding cassette 16, and includes: a supply tank 22 for supplying a reaction liquid 15; the intermediate roller 12 rotatably supported with its circumferential surface partly immersed in the supply tank 22; and the applying roller 6 arranged in parallel to and in contact with the intermediate roller 12 to rotate in the same direction. Further, the applying roller 6 is arranged in such a manner that its circumferential surface is in contact with and in parallel to the intermediate roller 12 that conveys the recording paper 19. Thus, when the recording paper 19 is conveyed, the intermediate roller 12 and the applying roller 6 rotate in association with the rotation of the intermediate roller 12. As a result, the reaction liquid 15 is supplied to the circumferential surface of the applying roller 6 by a supply roller 13, and the reaction liquid is applied uniformly by the supply roller 6 to the printing surface of the recording paper 19 sandwiched between the applying roller 6 and the intermediate roller 12.

The ink-jet recording apparatus shown in FIG. 1 is provided with a float 14 in the supply tank 22. The float 14 is formed of a substance having a smaller specific gravity than that of the reaction liquid 15, and floats on the surface of the reaction liquid 15, thereby allowing one to visually observe the remaining amount of the reaction liquid 15 through a remaining amount display window 21 formed of a transparent member.

Figure 2:
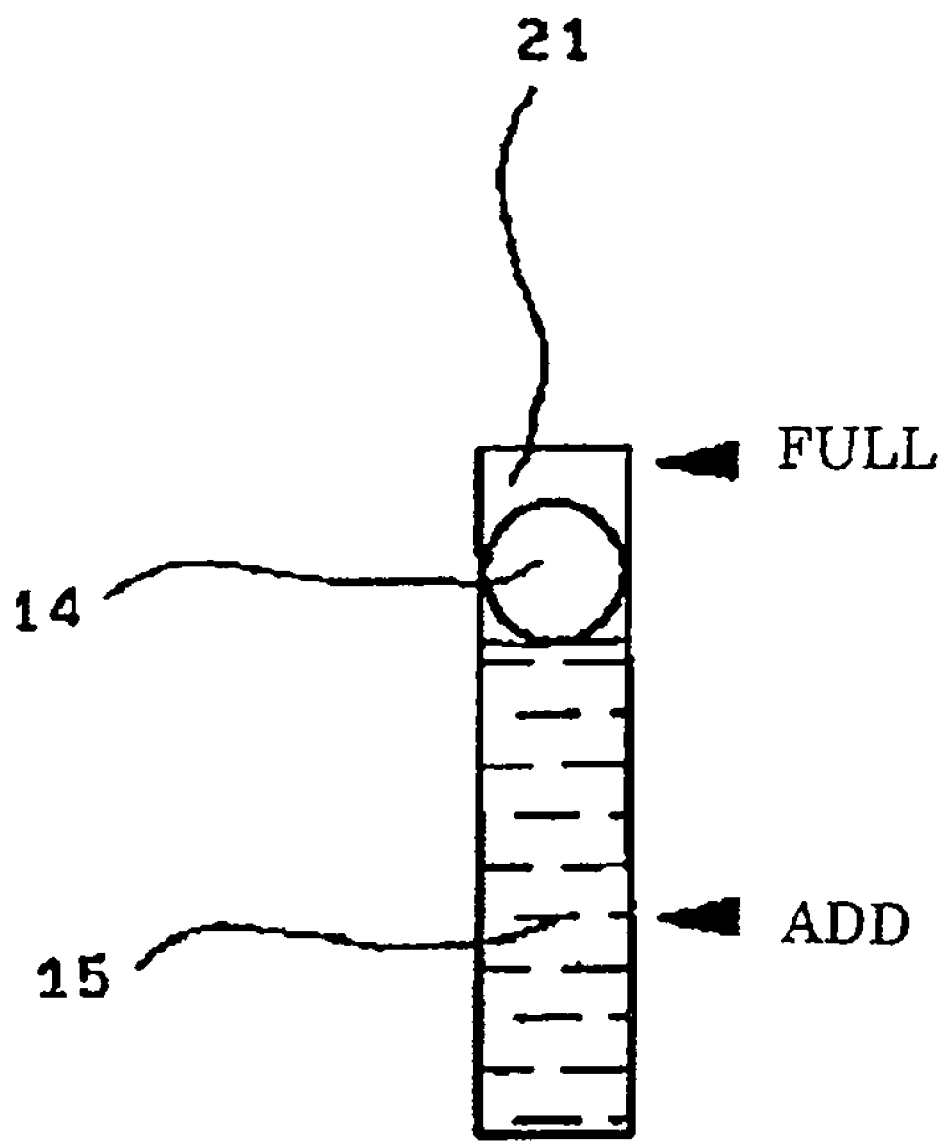
FIG. 2 is a front sectional view of a reaction liquid remaining amount display portion arranged in the ink-jet recording apparatus of FIG. 1.

FIG. 2 is a front view of the remaining amount display window. The remaining amount display window is provided with an indicator indicating a level of the remaining amount along the longitudinal direction of the remaining amount display window 21. In the figure, the tank is full with the reaction liquid when the surface of the reaction liquid 15 or the float 14 reaches the position marked "Full". In contrast, the surface of the reaction liquid 15 or the float 14 at the position marked "Add" indicates that the remaining amount of the reaction liquid 15 is small. Thus, external observation of the remaining amount display window 21 makes it very clear that the reaction liquid 15 should be supplied when the level of the reaction liquid 15 gradually drops and the float 14 reaches the Add line.

Figure 3:
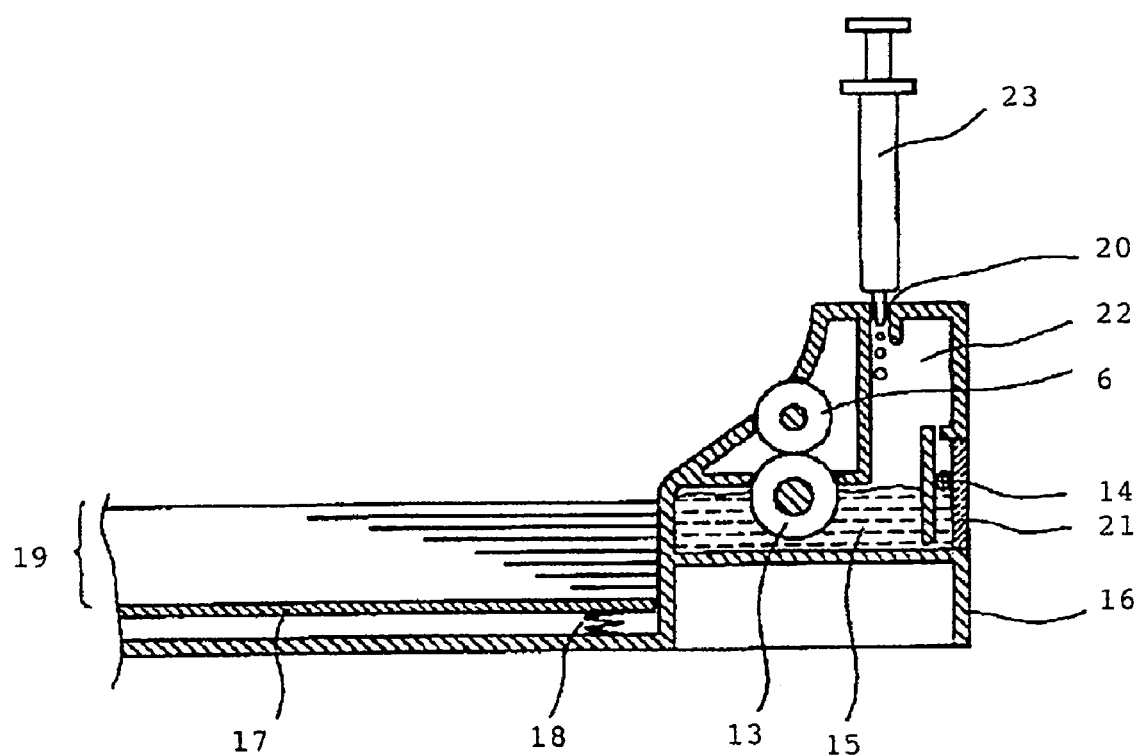
FIG. 3 is a schematic side sectional view showing a state where the ink-jet recording apparatus of FIG. 1 is replenished with a reaction liquid.

FIG. 3 describes the method of supplying the reaction liquid. That is, the sheet-feeding cassette 16 is pulled out of the main body of ink-jet recording apparatus, and the tip of an injector 23 is inserted into an inlet 20 made of a split-rubber member to inject the reaction liquid into the supply tank 22.

In this way, the recording paper having the reaction liquid applied thereto is then conveyed at a certain speed by a main conveying roller 7 and a pinch roller 8 pressed against the main conveying roller 7 to reach a recording part, where the ink is applied to the recording paper 19 from the recording head 1. The recording sheet 19 fed and printed in the configuration described above is discharged and conveyed by a sheet-discharge roller 3 and a spur 4 pressed against the sheet-discharge roller 3, and is then stacked on a sheet-discharge tray 5.

When a reaction liquid is applied by means of a roller or the like, the viscosity of the reaction liquid is particularly preferably higher than that of an ink because the ink can be effectively destabilized even with a small amount of the reaction liquid to be applied and the fixability or the like of a recorded product becomes good. More specifically, when the viscosity of the reaction liquid is high, a polyvalent metal ion is more likely to remain near the surface of a recording medium, and hence readily reacts with the ink. After the ink has reacted with the reaction liquid, a coloring material component in the ink preferably remains near the surface of the recording medium so that a water-soluble organic solvent, water, and the like quickly permeate into the recording medium. That is, solid-liquid separation is preferably performed quickly. Therefore, the viscosity of the reaction liquid is preferably as low as possible from the viewpoint of the fixability of a recorded product. The viscosity of the reaction liquid to be applied by means of a roller or the like is preferably 3 mPa·s or more and 100 mPa·s or less, or more preferably 5 mPa·s or more and 60 mPa·s or less. The viscosity of the reaction liquid or the ink in the present invention can be measured according to an ordinary method in an environment having a temperature of 25° C.

[Image Forming Method]

Hereinafter, an image forming method according to the present invention will be described by way of a specific example. The image forming method according to the present invention is an image forming method including performing recording by means of a black ink and at least one color ink on a recording medium such as plain paper according to an ink-jet recording method, characterized in that, when an image formed by the black ink and an image formed by the color ink are adjacent to each other to form an image, performing scanning for applying the black ink to form an image and thereafter performing scanning for applying the color ink to the area where the image has been formed by the precedent scanning. Hereinafter, a specific approach will be described.

Figure 4:
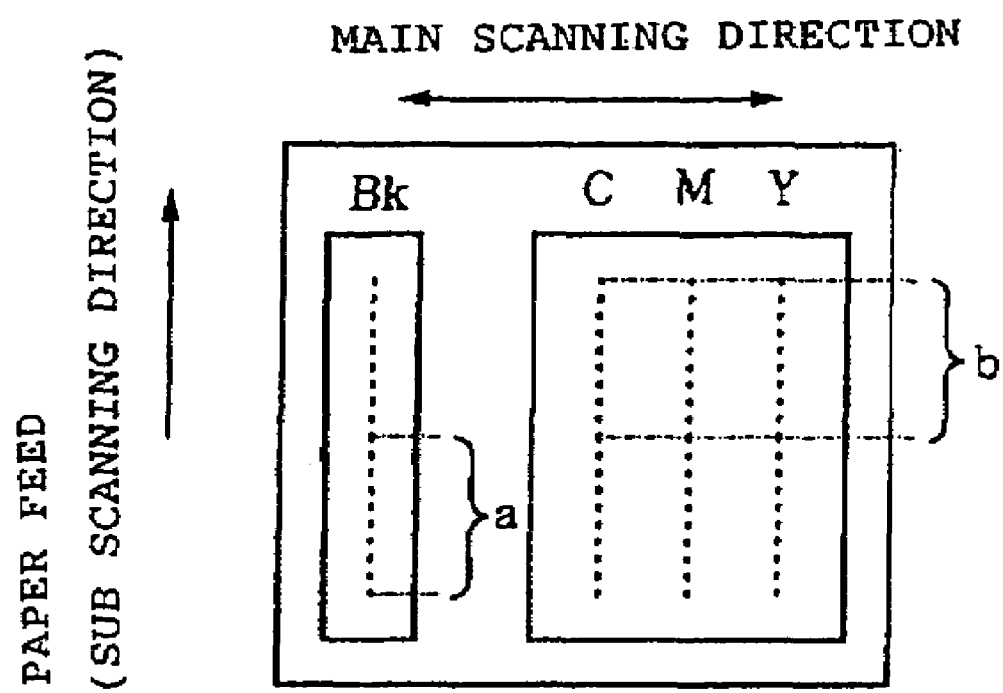
FIG. 4 is a view showing an example of the constitution of a recording head.

FIG. 4 shows an example of a recording head to be used for performing the image forming method according to the present invention. As shown in FIG. 4, the recording head includes an ejection orifice line (Bk) for ejecting a black ink and ejection orifice lines for ejecting three color inks, that is, a cyan (C) ink, a magenta (M) ink, and a yellow (Y) ink.

In the image forming method of the present invention, a recording head in which an ejection orifice line for black ink for ejecting a black ink and an ejection orifice line for color ink for ejecting a color ink are arranged so as to shift from each other in a sub scanning direction is preferably used for forming a full-color image. To be specific, for example, when the recording head shown in FIG. 4 is used to form an image, the entire region of the ejection orifice line for black ink is preferably used for the formation of an image composed only of a black color, while, when a full-color image in which a black image and a color image are present is to be formed, the part a of the ejection orifice line for black ink is preferably used for the black ink and the part b of the ejection orifice lines for color ink is preferably used for the color inks of C, M, and Y to form an image. Hereinafter, the formation of an image in which a black image and a color image are present will be described in more detail.

FIG. 4 shows an example of a recording head that can be used in the present invention. The recording head includes an ejection orifice line (Bk) for ejecting a black ink and ejection orifice lines for ejecting three color inks, that is, a cyan (C) ink, a magenta (M) ink, and a yellow (Y) ink. At first, the part a of the ejection orifice line for black ink is used to scan a print head in the horizontal direction in the figure (main scanning direction), whereby a black image is formed through one-path printing on a recording medium. Next, the recording medium is conveyed in the vertical direction in the figure (sub scanning direction) by a distance of a. During the process of the subsequent main scanning of the print head in an approaching direction, the part b of the ejection orifice lines for color ink is used to form a color image through one-path printing in the region where the image has been formed by the part a of the ejection orifice line for black ink. At this time, the part a of the ejection orifice line for black ink forms an image in a subsequent region. An image in which a black image and a color image are present is formed through the repetition of the above procedure.

Figure 5:
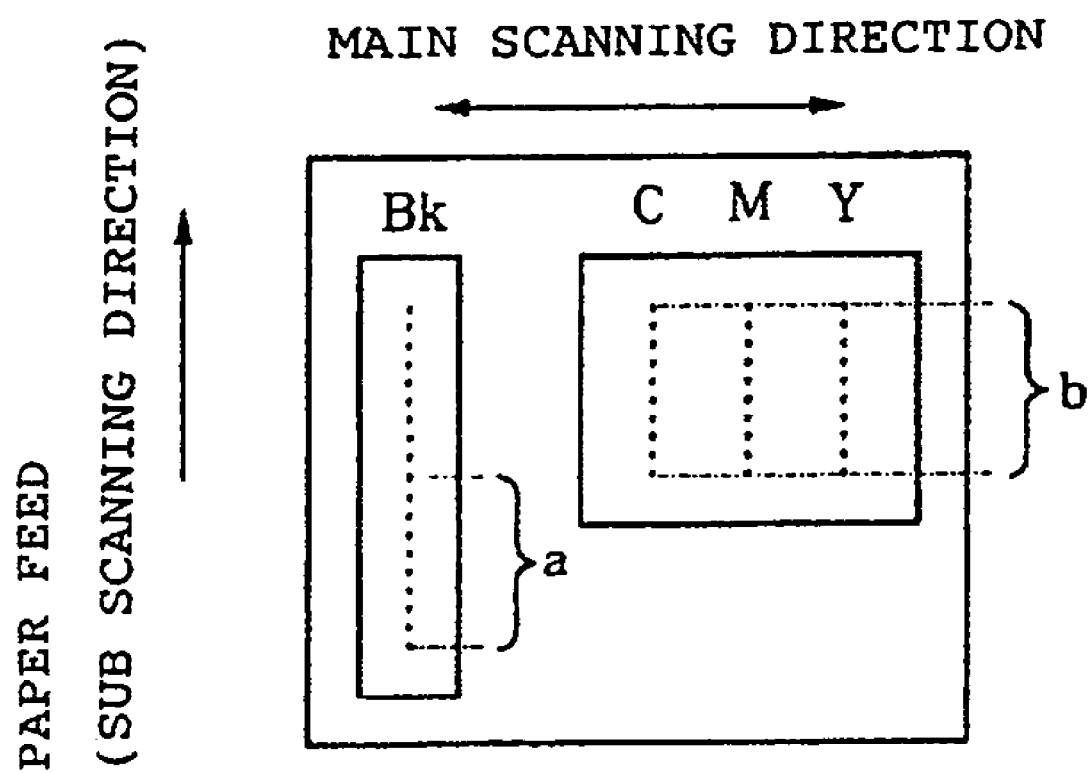
FIG. 5 is a view showing an example of the constitution of a recording head.

FIG. 5 shows another example of a recording head that can be used in the present invention. As in the case of FIG. 4, in FIG. 5 as well, the part a of the ejection orifice line for black ink is used for a black ink and the part b corresponding to the entire region of the ejection orifice lines for color ink is used for color inks of C, M, and Y. Then, in the same manner as that described above, an image in which a black image and a color image are present is formed.

Figure 6:
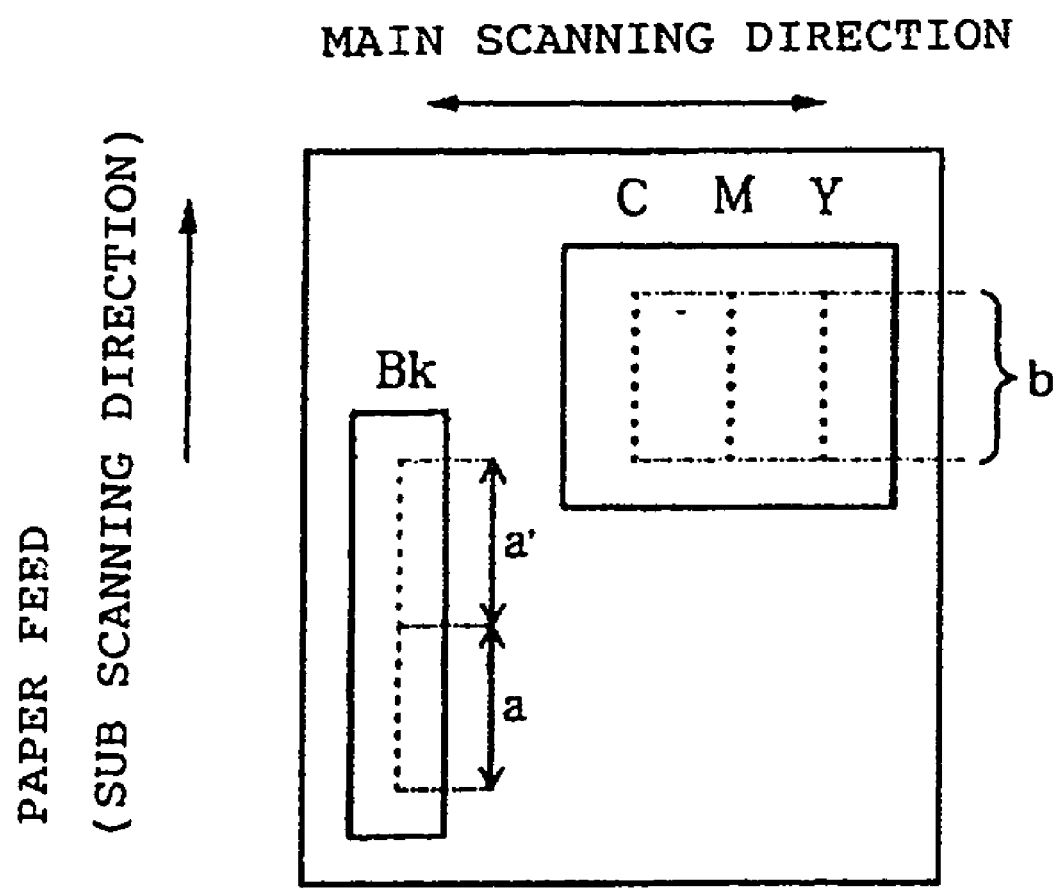
FIG. 6 is a view showing an example of the constitution of a recording head.

FIG. 6 shows another example of a recording head that can be used in the present invention. As in the case of FIG. 4, in FIG. 6 as well, the part a of the ejection orifice line for black ink is used for a black ink and the part b corresponding to the entire region of the ejection orifice lines for color ink is used for color inks of C, M, and Y. Then, an image in which a black image and a color image are present is formed. In the recording head shown in FIG. 6, the part a of the ejection orifice line for black ink and the part b of the ejection orifice lines for color ink are distant from each other by an amount a' for single sheet feeding. For this reason, in the recording head having such constitution, a time difference for one scan is excessively generated by a reciprocation during the time period commencing on the formation of a black image and ending on the formation of a color image. Therefore, the constitution of the recording head shown in FIG. 6 more effectively prevents bleeding between a black image and a color image than the constitution of the recording head shown in FIG. 5.

Figure 7:
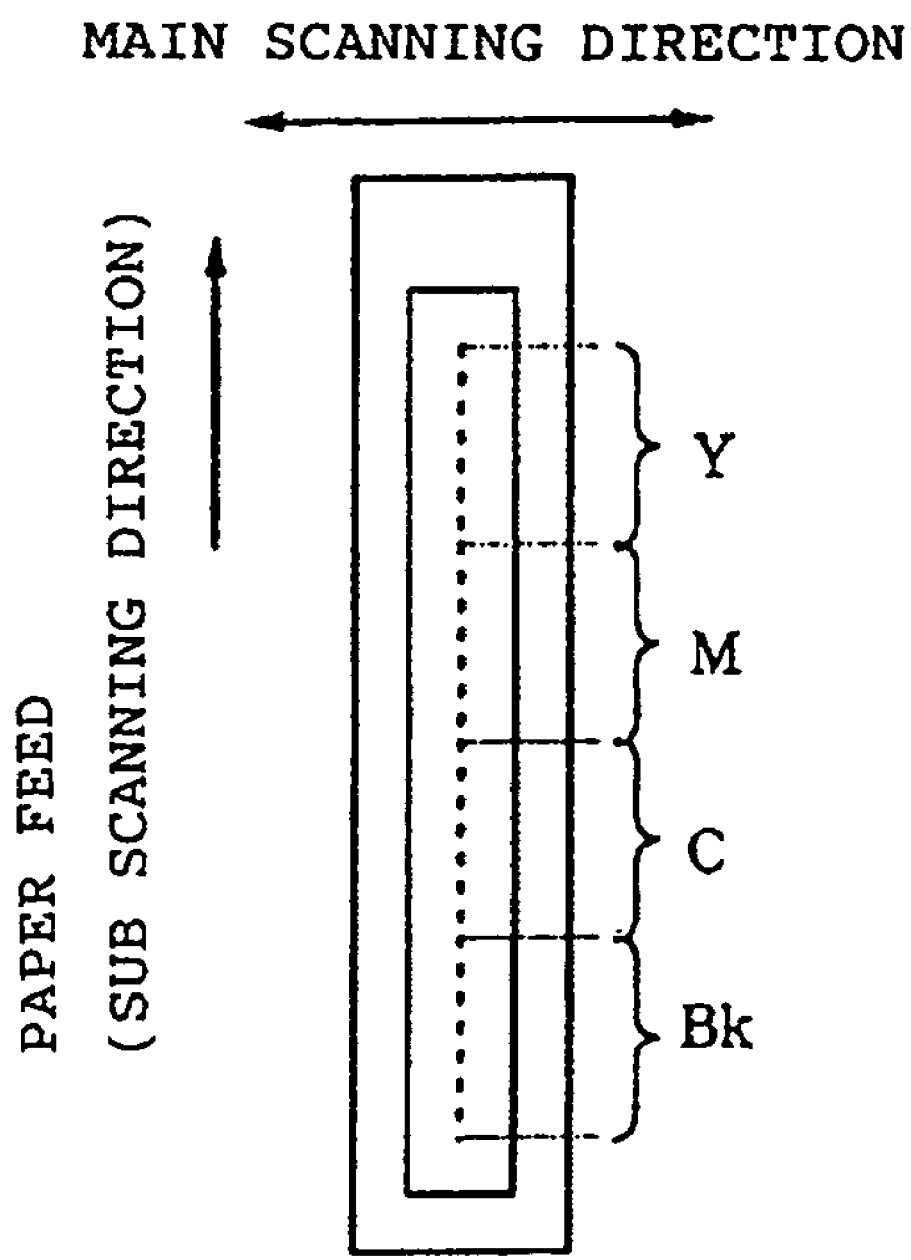
FIG. 7 is a view showing an example of the constitution of a recording head.

FIG. 7 shows another example of a recording head that can be used in the present invention. In the case where a recording head as shown in FIG. 7 in which ejection orifice lines for black and color inks are arranged in order in a single file in a sub scanning direction is used, a color image is formed after a black image has been formed in accordance with sheet feeding.

Figure 8:
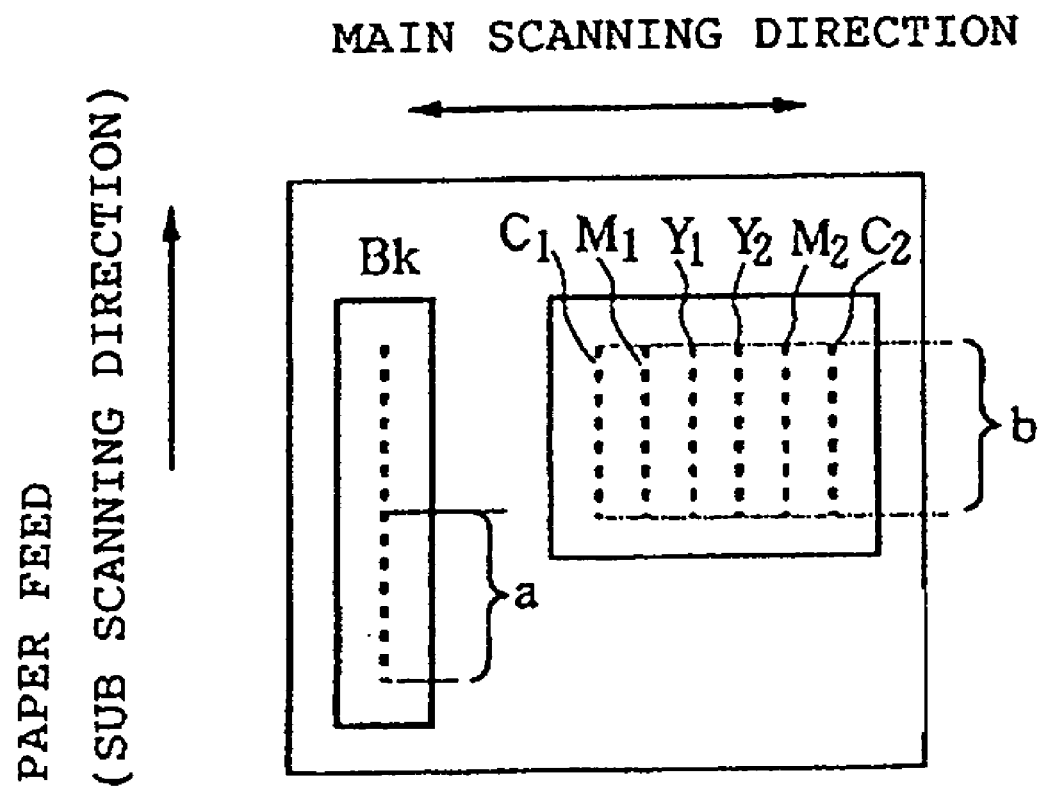
FIG. 8 is a view showing an example of the constitution of a recording head.

FIG. 8 shows another example of a recording head that can be used in the present invention. The recording head shown in FIG. 8 has two ejection orifice lines for each of cyan ink (C1 and C2), magenta ink (M1 and M2), and yellow ink (Y1 and Y2) arranged so as to be symmetric with respect to each other in the main scanning direction in such a manner that the order of impact of color inks in a going direction of a main scan and that in a returning direction of the main scan are identical to each other. As a result, bidirectional printing can be performed even in the formation of an image in which a black image and a color image are present. In this case, at first, a black image is formed by the part a of the ejection orifice for black ink and then a recording medium is conveyed by a distance of a in the sub scanning direction. During the process of the subsequent main scanning of a print head in the returning direction, the part b of the ejection orifice lines for color ink is used to form a color image through one-path printing in the image region where the image has been formed by the part a of the ejection orifice line for black ink. At this time, the part a of the ejection orifice line for black ink forms an image in a subsequent region. An image in which a black image and a color image are present is formed through the repetition of the above procedure.

Figure 9:
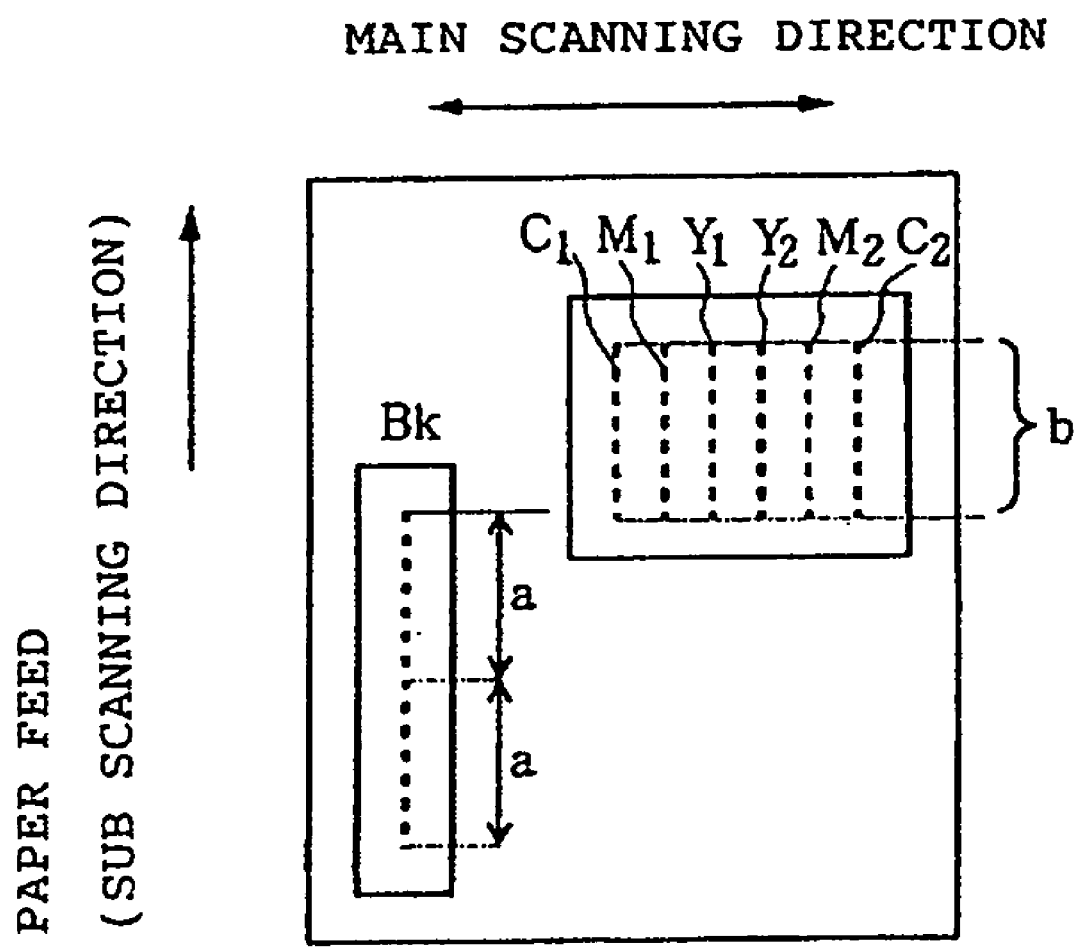
FIG. 9 is a view showing an example of the constitution of a recording head.

Even in such recording head corresponding to bidirectional printing as shown in FIG. 8, as in the case of the recording head described with reference to FIG. 6, the part a of the ejection orifice line for black ink and the part b of the ejection orifice lines for color ink may be distant from each other by an amount a' for single sheet feeding (see FIG. 9), and a time difference for one scan may be generated by a reciprocation during the time period from the formation of a black image to the formation of a color image, to thereby prevent bleeding between a black image and a color image with improved effectiveness.

The image forming method according to the present invention has been described above. Of course, the form of a recording head that can be used for the image forming method according to the present invention is not limited to those shown in FIGS. 4 to 9. In addition, printing is not limited to one-path printing because the number of paths differs from recording apparatus to recording apparatus.

The image forming method by means of an ink set having such reaction liquid as described above includes the steps of:
(i) applying, to a recording medium, the reaction liquid capable of making the state of dispersion of a water-insoluble coloring material in the aqueous ink constituting the ink set; and
(ii) applying the aqueous ink constituting the ink set to the recording medium to which the reaction liquid has been applied.

In the case where an image is to be formed by means of a reaction liquid, black ink and color ink may be used to form an image in one scan as long as bleeding resistance is good even when an image formed by the black ink and an image formed by the color ink are adjacent to each other.

[Recording Medium]

Any recording medium can be used for forming an image by means of the aqueous ink of the present invention as long as ink is applied to the recording medium to perform recording. In particular, in the present invention, for example, plain paper or a recording medium having on at least one of its surfaces a coating layer for receiving aqueous ink is preferably used. Of course, the present invention is not limited thereto.

An example of the recording medium having a coating layer for receiving aqueous ink includes a recording medium having, on at least one of its surfaces each containing at least a hydrophilic polymer and/or an inorganic porous body, a coating layer for receiving aqueous ink. The formation of an image on such recording medium exerts a particularly excellent effect. There are various kinds of recording media each having a coating layer for receiving aqueous ink depending on, for example, a surface state, the thickness of the coating layer, the size of a pore for absorbing the aqueous ink, a difference in material constituting an ink-absorbing layer, and the kind of substrate. Examples of such recording media include: high glazed paper and a glossy film each having high surface gloss; lightly glossy paper, semi-gloss paper, and mat paper with no gloss each of which has surface gloss adjusted through processing or the like; and lightly coated paper with a small amount of coating layer.

A recording medium to be used for ink-jet recording is selected from various media depending on a purpose. For example, glossy paper for obtaining an image having gloss comparable to that of silver halide photographic paper, or art paper utilizing the feeling of a substrate (such as a printing paper tone, canvas tone, or Japanese paper tone) for representing a drawing, a photograph, a graphic image, or the like as one likes has been used.

Any conventionally known substance can be used for the hydrophilic polymer constituting the coating layer of the above-described recording medium. Examples thereof include starch, carboxymethylcellulose, methylcellulose, hydroxyethylcellulose, hydroxypropylcellulose, alginic acid, gelatin, polyvinyl alcohol, polyvinyl acetal, polyethylene oxide, sodium polyacrylate, cross-linked polyacrylic acid, polyvinyl methyl ether, polystyrenesulfonic acid, quaternary polyvinyl pyridine, polyacrylamide, polyvinyl pyrrolidone, polyamine, an aqueous urethane resin, a water-soluble acrylic resin, a water-soluble epoxy compound, and water-soluble polyester. Modified products of the above polymers such as ion-modified products including cation-modified polyvinyl alcohol and cation-modified polyvinyl pyrrolidone can also be appropriately used. Examples of the inorganic porous body to be used for constituting the ink-receiving layer of the above-described recording medium include silica gel, alumina, zeolite, and porous glass.

EXAMPLES

Hereinafter, the present invention will be described more specifically by way of examples, comparative examples, and reference examples. The present invention is not limited to the following examples without departing from the gist of the present invention. The terms "part" and "%" in the following description are on a mass basis unless otherwise stated.

[Preparation of Pigment Dispersion Solution and Reaction Liquid]

(Preparation of Black Pigment Dispersion Solution)

10 parts of carbon black having a specific surface area of 210 $m^2/g$ and a DBP oil absorption of 74 ml/100 g, 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 µm (manufactured by Fuji Photo Film Co., Ltd.) under pressure to prepare a resin-dispersion black pigment. Then, water was added to disperse the resin-dispersion black pigment thus prepared to attain a pigment concentration of 10 mass %, thereby preparing a dispersion solution. Thus, a black pigment dispersion solution was prepared.

(Preparation of Cyan Pigment Dispersion Solution)

10 parts of a pigment (C.I. Pigment Blue 15:3), 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 µm (manufactured by Fuji Photo Film Co., Ltd.) under pressure to prepare a resin-dispersion cyan pigment. Then, water was added to disperse the resin-dispersion cyan pigment thus prepared to attain a pigment concentration of 10 mass %, thereby preparing a dispersion solution. Thus, a cyan pigment dispersion solution was prepared.

(Preparation of Magenta Pigment Dispersion Solution)

10 parts of a pigment (C.I. Pigment Red 122), 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 µm (manufactured by Fuji Photo Film Co., Ltd.) under pressure to prepare a resin-dispersion magenta pigment. Then, water was added to disperse the resin-dispersion magenta pigment thus prepared to attain a pigment concentration of 10 mass %, thereby preparing a dispersion solution. Thus, a magenta pigment dispersion solution was prepared.

(Preparation of Yellow Pigment Dispersion Solution)

10 parts of a pigment (C.I. Pigment Yellow 74), 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 µm (manufactured by Fuji Photo Film Co., Ltd.) under pressure to prepare a resin-dispersion yellow pigment. Then, water was added to disperse the resin-dispersion yellow pigment thus prepared to attain a pigment concentration of 10 mass %, thereby preparing a dispersion solution. Thus, a yellow pigment dispersion solution was prepared.

(Preparation of Reaction Liquid)

The respective components shown below were mixed and sufficiently stirred. After that, the resultant was filtered through a microfilter having a pore size of 0.2 µm (manufactured by Fuji Photo Film Co., Ltd.) under pressure to prepare a reaction liquid.

Composition of reaction liquid

| | |
|---|---|
| Magnesium nitrate (hexahydrate) | 15.0 mass % |
| Trimethylolpropane | 25.0 mass % |
| Acetylenol EH | 1.0 mass % |
| (Ethylene oxide adduct of acetylene glycol; manufactured by Kawaken Fine Chemicals Co., Ltd.) | |
| Water | Balance |

[Method of Judging on Good Medium and Poor Medium in Water-Soluble Organic Solvents]

The following experiment was performed in order to select a water-soluble organic solvent to act as a good medium or a poor medium for the pigment in each of the above pigment dispersion solutions. First, aqueous solutions of the respective pigment dispersion solutions thus prepared each having a solid concentration of 10 mass % were prepared. A solvent-judgment dispersion solution A and a solvent-judgment water dispersion solution B for judgment on a good medium and a poor medium were prepared by using the aqueous solutions and the respective water-soluble organic solvents at the following compounding ratios.

(Solvent-Judgment Dispersion Solution A)

Each color pigment dispersion solution having solid concentration of 10 mass %: 50 parts Each water-soluble organic solvent shown in Table 1: 50 parts (Solvent-Judgment Water Dispersion Solution B)

Each color pigment dispersion solution having solid concentration of 10 mass %: 50 parts Pure water: 50 parts (Determination Method)

Next, 10 g of the dispersion solution A for judgment on a good medium and a poor medium thus prepared were charged into a transparent sample bottle made of glass and equipped with a cap. After the bottle had been capped, the dispersion solution was sufficiently stirred, and the bottle was left standing in an oven at 60° C. for 48 hours. After that, the dispersion solution taken out of the oven was provided as a sample for measurement, and the average particle size of the pigment in the dispersion solution was measured with a fiber-optics particle analyzer (trade name: FPAR-1000; manufactured by Otsuka Electronics Co., Ltd.). The measured particle size was defined as the average particle size of the dispersion solution A for judgment after storage at 60° C. for 48 hours (average particle size of the pigment measured without dilution). Meanwhile, the water dispersion solution B for judgment was not stored under heat, and the average particle size of the pigment in the dispersion solution was measured with the fiber-optics particle analyzer in the same manner as that described above. Then, when the average particle size of the pigment in the dispersion solution A was larger than that of the pigment in the water dispersion solution B, a water-soluble organic solvent was determined to be a poor medium. When the average particle size of the pigment in the dispersion solution A was equal to or smaller than that of the pigment in the water dispersion solution B, a water-soluble organic solvent was determined to be a good medium.

[Measurement of Ka Value for Water-Soluble Organic Solvent]

First, in measuring the Ka value of each water-soluble organic solvent, a dye aqueous solution at a dye concentration of 0.5 mass % having the following composition was prepared. Such dye aqueous solution was used for visualizing a colorless and transparent sample by staining the sample, to thereby facilitate the measurement of the Ka value.

Water-soluble dye C.I. Direct Blue 199: 0.5 part

Pure water: 99.5 parts

Next, a 20% aqueous solution of each water-soluble organic solvent to be measured stained with the 0.5 mass % dye aqueous solution and having the following composition was prepared.

0.5 mass % dye aqueous solution: 80 parts

Water-soluble organic solvent shown in Table 1: 20 parts

The Ka value of the 20 mass % aqueous solution of each water-soluble organic solvent thus prepared as a sample for measurement was measured by means of a dynamic permeability tester (trade name: Dynamic permeability tester S; manufactured by Toyo Seiki Seisaku-Sho, Ltd.) according to the Bristow method.

[Results of Judgment and Measurements]

Table 1 shows the results of judgment as to whether each water-soluble organic solvent that can be used for ink thus measured is a good medium or a poor medium for any one of the black pigment dispersion solution, the cyan pigment dispersion solution, the magenta pigment dispersion solution, and the yellow pigment dispersion solution, and shows the measurement of the Ka value of each water-soluble organic solvent in a 20 mass % aqueous solution. 'o' and 'x' in the table represent a good medium and a poor medium, respectively.

TABLE 1

|  | Water-insoluble coloring material | | | | Ka value of 20-mass % aqueous solution of water-soluble organic solvent [ml/m$^2$/msec$^{1/2}$] |
|---|---|---|---|---|---|
| Water-soluble organic solvent | Black pigment dispersion solution | Cyan pigment dispersion solution | Magenta pigment dispersion solution | Yellow pigment dispersion solution | |
| Glycerin | ○ | ○ | ○ | ○ | 0.13 |
| Trimethylolpropane | ○ | ○ | ○ | ○ | 0.19 |
| Polyethylene glycol 600 | X | X | X | X | 0.17 |

[Preparation of Ink]

Examples 1 to 5

The respective components shown in each of Tables 2 to 6 below were mixed and sufficiently stirred. After that, the resultant was filtered through a microfilter having a pore size of 3.0 μm (manufactured by Fuji Photo Film Co., Ltd.) under pressure to prepare each aqueous ink and an ink set of each of Examples 1 to 5. The B/A value in each table is obtained by dividing the total content (mass %) of the poor medium in each aqueous ink, which is denoted by B. by the total content (mass %) of the good medium in the ink, which is denoted by A. In preparing the aqueous ink of each example, the B/A value was adjusted to be 0.5 or more and 3.0 or less, and the cyan ink was adjusted to have the maximum B/A value out of the aqueous inks in each ink set.

TABLE 2

| | Example 1 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 10.0 | 7.0 | 11.0 | 11.0 |
| Polyethylene glycol 600 | 10.0 | 13.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 1.86 | 0.82 | 0.82 |

(*)Ethylene oxide adduct of acetylene glycol (surfactant; manufactured by Kawaken Fine Chemicals Co., Ltd.)

TABLE 3

| | Example 2 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 10.0 | 7.0 | 11.0 | 11.0 |
| Polyethylene glycol 600 | 10.0 | 14.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 2.00 | 0.82 | 0.82 |

(*)Ethylene oxide adduct of acetylene glycol (surfactant; manufactured by Kawaken Fine Chemicals Co., Ltd.)

TABLE 4

| | Example 3 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 10.0 | 7.0 | 11.0 | 11.0 |
| Polyethylene glycol 600 | 10.0 | 12.0 | 9.0 | 9.0 |
| Acetylenol E-100(*) | 0.1 | 0.1 | 0.1 | 0.1 |

TABLE 4-continued

Example 3

| | Black Ink | Cyan Ink | Magenta Ink | Yellow Ink |
|---|---|---|---|---|
| Pure water | Balance | Balance | Balance | Balance |
| B/A value | 1.00 | 1.71 | 0.82 | 0.82 |

(*)Ethylene oxide adduct of acetylene glycol (surfactant; manufactured by Kawaken Fine Chemicals Co., Ltd.)

TABLE 5

Example 4

| | Black Ink | Cyan Ink | Magenta Ink | Yellow Ink |
|---|---|---|---|---|
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 10.0 | 8.0 | 11.0 | 11.0 |
| Polyethylene glycol 600 | 10.0 | 12.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 1.50 | 0.82 | 0.82 |

(*)Ethylene oxide adduct of acetylene glycol (surfactant; manufactured by Kawaken Fine Chemicals Co., Ltd.)

TABLE 6

Example 5

| | Black Ink | Cyan Ink | Magenta Ink | Yellow Ink |
|---|---|---|---|---|
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 10.0 | 11.0 | 11.0 | 11.0 |
| Polyethylene glycol 600 | 10.0 | 12.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 1.10 | 0.82 | 0.82 |

(*)Ethylene oxide adduct of acetylene glycol (surfactant; manufactured by Kawaken Fine Chemicals Co., Ltd.)

Reference Examples 1 and 2

The respective components shown in each of Tables 7 and 8 below were mixed and sufficiently stirred. After that, the resultant was filtered through a microfilter having a pore size of 3.0 μm (manufactured by Fuji Photo Film Co., Ltd.) under pressure to prepare each aqueous ink and an ink set of each of Tables 7 and 8. The B/A value in each table is obtained by dividing the total content (mass %) of the poor medium in each aqueous ink, which is denoted by B, by the total content (mass %) of the good medium in the ink, which is denoted by A. In preparing the aqueous ink of each reference example, the B/A value was adjusted to be 0.5 or more and 3.0 or less.

TABLE 7

Reference Example 1

| | Black Ink | Cyan Ink | Magenta Ink | Yellow Ink |
|---|---|---|---|---|
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 7.0 | 11.0 | 11.0 |
| Polyethylene glycol 600 | 10.0 | 13.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 1.86 | 0.82 | 0.82 |

(*)Ethylene oxide adduct of acetylene glycol (surfactant; manufactured by Kawaken Fine Chemicals Co., Ltd.)

TABLE 8

Reference Example 2

| | Black Ink | Cyan Ink | Magenta Ink | Yellow Ink |
|---|---|---|---|---|
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 10.0 | 10.0 | 11.0 | 11.0 |
| Polyethylene glycol 600 | 10.0 | 10.0 | 9.0 | 9.0 |
| Acetylenol E-100(*) | 0.1 | 0.1 | 0.1 | 0.1 |

TABLE 8-continued

| | Reference Example 2 | | | |
|---|---|---|---|---|
| | Black Ink | Cyan Ink | Magenta Ink | Yellow Ink |
| Pure water | Balance | Balance | Balance | Balance |
| B/A value | 1.00 | 1.00 | 0.82 | 0.82 |

(*)Ethylene oxide adduct of acetylene glycol (surfactant; manufactured by Kawaken Fine Chemicals Co., Ltd.)

Comparative Examples 1 to 3

The respective components shown in each of Tables 9 to 11 below were mixed and sufficiently stirred. After that, the resultant was filtered through a microfilter having a pore size of 3.0 μm (manufactured by Fuji Photo Film Co., Ltd.) under. pressure to prepare each aqueous ink and an ink set of each of Comparative Examples 1 to 3. The B/A value in each table is obtained by dividing the total content (mass %) of the poor medium in each aqueous ink, which is denoted by B, by the total content (mass %) of the good medium in the ink, which is denoted by A.

TABLE 9

| | Comparative Example 1 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 10.0 | 4.0 | 11.0 | 11.0 |
| Polyethylene glycol 600 | 10.0 | 15.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 3.75 | 0.82 | 0.82 |

(*)Ethylene oxide adduct of acetylene glycol (surfactant; manufactured by Kawaken Fine Chemicals Co., Ltd.)

TABLE 10

| | Comparative Example 2 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 30.0 | | |
| Magenta pigment dispersion solution | | | 50.0 | |

TABLE 10-continued

| | Comparative Example 2 | | | |
|---|---|---|---|---|
| | Black Ink | Cyan Ink | Magenta Ink | Yellow Ink |
| pigment dispersion solution | | | | |
| Yellow pigment dispersion solution | | | | 50.0 |
| Glycerin | 10.0 | 15.0 | 11.0 | 11.0 |
| Polyethylene glycol 600 | 10.0 | 6.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 0.40 | 0.82 | 0.82 |

(*)Ethylene oxide adduct of acetylene glycol (surfactant; manufactured by Kawaken Fine Chemicals Co., Ltd.)

TABLE 11

| | Comparative Example 3 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 30.0 | | |
| Magenta pigment dispersion solution | | | 50.0 | |
| Yellow pigment dispersion solution | | | | 50.0 |
| Glycerin | 6.0 | 3.0 | 7.0 | 7.0 |
| Polyethylene glycol 600 | 10.0 | 13.0 | 9.0 | 9.0 |
| Acetylenol E-100(*) | 0.1 | 0.1 | 0.1 | 0.1 |
| Pure water | Balance | Balance | Balance | Balance |
| B/A value | 1.00 | 1.86 | 0.82 | 0.82 |

(*)Ethylene oxide adduct of acetylene glycol (surfactant; manufactured by Kawaken Fine Chemicals Co., Ltd.)

[Evaluation 1: Image Density]

A recorded product was produced by means of the ink of each of Examples 1 to 5, Reference Examples 1 and 2, and Comparative Examples 1 to 3 thus prepared. A modified apparatus of an ink-jet recording apparatus PIXUS 950i (manufactured by CANON Inc.) having an on-demand multi-recording head for ejecting ink by applying thermal energy to the ink in accordance with a recording signal was used for the production of the recorded product. To be specific, a letter measuring 2 cm×2 cm including a solid print portion of a primary color and a solid print portion of a secondary color was printed on any one of the following recording media to produce a recorded product. After the resultant recorded product had been left for 1 day, the image density of a cyan solid print portion was measured. The image density was measured by means of a GRETAG Spectrolino (manufactured by GRETAGMACBETH). The evaluation criteria for an image density are as follows. Table 11 shows the results of the evaluation.

The following plain papers were used as recording media.
PPC paper PB Paper (manufactured by CANON Inc.)
PPC paper SC250C (manufactured by CANON Inc.)
PPC paper 4200 (manufactured by Fuji Xerox Co., Ltd.)
Highly white paper SW-101 (manufactured by CANON Inc.)
PPC paper 4024 (manufactured by Fuji Xerox Co., Ltd.)

(Evaluation Criteria)
AA: Each paper has a sufficient image density.
A: Some papers have slightly low image densities, but the other papers have sufficient image densities.
B: Some papers do not have sufficient image densities, and the other papers have slightly low image densities.
C: Nearly no paper has a sufficient image density.

B: Most of all papers have narrow color reproduction ranges near cyan regions.
C: Each paper has a narrow color reproduction range near a cyan region.

[Evaluation 3: Storage Stability]

The ink of each of Examples 1 to 5, Reference Examples 1 and 2, and Comparative Examples 1 to 3 thus prepared was charged into a shot bottle, and the bottle was tightly stopped. After the bottle had been stored in an oven at 60° C. for 2 weeks, the state of the ink was observed. The evaluation criteria for storage stability are as follows. Table 11 shows the results of the evaluation.

A: A coloring material is uniformly and stably dispersed in ink.
B: Ink is gelled, the upper portion of the ink is transparent, or the ink is apparently thickened.

TABLE 12

|  |  | Image density | | | | Color | Storage stability | | | |
|---|---|---|---|---|---|---|---|---|---|---|
|  |  | Black | Cyan | Magenta | Yellow | Balance | Black | Cyan | Magenta | Yellow |
| Example | 1 | AA | AA | AA | AA | AA | A | A | A | A |
|  | 2 | AA | AA | AA | AA | AA | A | A | A | A |
|  | 3 | AA | A | AA | AA | A | A | A | A | A |
|  | 4 | AA | A | AA | AA | A | A | A | A | A |
|  | 5 | AA | A | AA | AA | A | A | A | A | A |
| Reference | 1 | AA | AA | AA | AA | A | A | A | A | A |
| Example | 2 | AA | B | AA | AA | B | A | A | A | A |
| Comparative | 1 | AA | AA | AA | AA | AA | A | C | A | A |
| Example | 2 | AA | C | AA | AA | C | A | A | A | A |
|  | 3 | C | C | C | C | C | A | A | A | A |

[Evaluation 2: Color Balance]

A recorded product was produced by means of the ink of each of Examples 1 to 5, Reference Examples 1 and 2, and Comparative Examples 1 to 3 thus prepared. A modified apparatus of an ink-jet recording apparatus PIXUS 950i (manufactured by CANON Inc.) having an on-demand multi-recording head for ejecting ink by applying thermal energy to the ink in accordance with a recording signal was used for the production of the recorded product. To be specific, a letter measuring 2 cm×2 cm including a solid print portion of a primary color and a solid print portion of a secondary color was printed on any one of the following recording media to produce a recorded product. After the resultant recorded product had been left for 1 day, the image density of a cyan solid print portion was measured. The image density was measured by means of a GRETAG Spectrolino (manufactured by GRETAGMACBETH). The evaluation criteria for a color balance are as follows. Table 11 shows the results of the evaluation.

The following plain papers were used as recording media.
PPC paper PB Paper (manufactured by CANON Inc.)
PPC paper SC250C (manufactured by CANON Inc.)
PPC paper 4200 (manufactured by Fuji Xerox Co., Ltd.)
Highly white paper SW-101 (manufactured by CANON Inc.)
PPC paper 4024 (manufactured by Fuji Xerox Co., Ltd.)

(Evaluation Criteria)
AA: Each paper has a sufficiently wide color reproduction range in any color region, and has an extremely good color balance.
A: Some papers have narrow color reproduction ranges near cyan regions, but the other papers have sufficiently wide color reproduction ranges and good color balances.

[Evaluation 4: Bronzing Resistance]

A recorded product was produced by means of the ink of each of Examples 1 to 5 and Reference Example 1 thus prepared. A modified apparatus of an ink-jet recording apparatus BJF 900 (manufactured by CANON Inc.) having an on-demand multi-recording head for ejecting ink by applying thermal energy to the ink in accordance with a recording signal was used for the production of the recorded product. To be specific, a solid print image measuring 5 cm×5 cm was printed on a recording medium (Professional Photopaper PR-101; manufactured by CANON Inc.) by means of each single ink color and a secondary color by changing the amount of ink to be applied up to 200% duty in an increment of 10% duty to produce a recorded product. A pro photopaper mode was selected for a printer driver.

An image on the resultant recorded product was visually observed. As a result, in Reference Example 1, bronzing was remarkable in each of cyan, green, and blue colors. In the case where the ink of each of Examples 1 to 5 was used, bronzing in each of a cyan color and a secondary color (green or blue) associated with the cyan color was significantly reduced as compared to the case where the ink of Reference Example 1 was used, so image quality on a recording medium having surface gloss was superior to that of Reference Example 1.

[Evaluation 5: Image Density in Two-Liquid System]

A recorded product was produced by means of the ink of each of Example 1 and Comparative Example 2, and a reaction liquid. Used for the production of the recorded product was an ink-jet recording apparatus BJS 600 (manufactured by CANON Inc.) having an on-demand multi-recording head for ejecting ink by applying thermal energy to the ink in accordance with a recording signal, the apparatus being modified so as to have a mechanism shown in FIG. 1 with which a reaction liquid was applied to a recording medium by means of an applying roller. To be specific, the reaction liquid was applied to any one of the following recording media. After the reaction liquid had been fixed to the recording medium, a letter measuring 2 cm×2 cm including a solid print portion of a primary color and a solid print portion of a secondary color was printed by means of each ink to produce a recorded product. The speed of the roller and the pressure at which the roller contacted with the recording medium were adjusted in such a manner that the amount of the reaction liquid to be applied would be 2.4 g/m². After the resultant recorded product had been left for 1 day, the image density of a cyan solid print portion was measured. The image density was measured by means of a GRETAG Spectrolino (manufactured by GRETAGMACBETH).

The following plain papers were used as recording media.
PPC paper PB Paper (manufactured by CANON Inc.)
PPC paper SC250C (manufactured by CANON Inc.)
PPC paper 4200 (manufactured by Fuji Xerox Co., Ltd.)
Highly white paper SW-101 (manufactured by CANON Inc.)
PPC paper 4024 (manufactured by Fuji Xerox Co., Ltd.)

The recorded product thus produced was evaluated for image density. As a result, when each ink of Example 1 was used, a color balance was good and an image density was excellent. When each ink of Comparative Example 2 was used, a color balance was lost.

This application claims priority from Japanese Patent Application No. 2004-190493 filed Jun. 28, 2004, which is hereby incorporated by reference herein.

What is claimed is:

1. An ink set having four kinds of aqueous inks composed of the cyan ink, a magenta ink, a yellow ink, and a black ink, each ink comprising at least (a) water; (b) a water-insoluble coloring material; and (c) plurality of water-soluble organic solvents including (1) a good medium or good mediums for the water-insoluble coloring material and (2) a poor medium or poor mediums for the water-insoluble coloring material, wherein in the cyan ink, the ratio $B_1/A_1$ is 0.5 or more and 3.0 or less, when $A_1$ denotes the total content (mass %) of the good medium in the cyan ink and $B_1$ denotes the total content (mass %) of the poor medium in the cyan ink; and wherein in the cyan ink, a water-soluble organic solvent showing a maximum Ka value out of respective Ka values of the plurality of water-soluble organic solvents as each determined by the Bristow method is the poor medium; and wherein for each aqueous ink in the ink set other than the cyan ink, the ratio B/A satisfies the following expression (I), when A denotes the total content (mass %) of the good medium or good mediums in the aqueous ink and B denotes the total content (mass %) of the poor medium or poor mediums in the aqueous ink:

$$(B_1/A_1)/(B/A) > 1 \tag{I}.$$

2. An ink set according to claim 1, wherein the following expression (I') is satisfied, $$(B_1/A_1)/(B/A) \geq 1.8 \tag{I'}.$$

3. An ink set according to claim 1, wherein the content (mass %) of the poor medium in the cyan ink is 4 mass % or more based on the total mass of the cyan ink.

4. A set of an ink and a reaction liquid, wherein the ink comprises at least one kind of aqueous ink in the ink set according to claim 1; and wherein the reaction liquid is capable of making the state of dispersion of a water-insoluble coloring material in the at least one kind of aqueous ink in the ink set upon contact with the aqueous ink.

5. An image forming method using the set of an ink and a reaction liquid according to claim 4, comprising the steps of:

(i) applying the reaction liquid to a recording medium; and (ii) applying at least one aqueous ink in the ink set to the recording medium to which the reaction liquid has been fixed.

6. An image forming method comprising applying the black ink and at least one color ink in the ink set according to claim 1 on a recording medium by an ink-jet recording method.

7. An image forming apparatus comprising the ink set according to claim 1 and a recording head for ejecting the inks of the ink set.

* * * * *

UNITED STATES PATENT AND TRADEMARK OFFICE
CERTIFICATE OF CORRECTION

PATENT NO. : 7,347,890 B2
APPLICATION NO. : 11/313959
DATED : March 25, 2008
INVENTOR(S) : Yasuhiro Nito et al.

It is certified that error appears in the above-identified patent and that said Letters Patent is hereby corrected as shown below:

ON THE TITLE PAGE, AT ITEM (57), ABSTRACT
Line 4, "plurality" should read --a plurality--.

COLUMN 9
Line 24, "shows" should read --show--.

COLUMN 11
Line 8, "5-mass" should read --5 mass--.
Line 14, "5-mass" should read --5 mass--.

COLUMN 12
Line 20, "to required" should read --to be required--.
Line 65, "A" should read --An--.

COLUMN 13
Line 6, "needs" should read --need--.

COLUMN 15
Line 2, "B2" should read --$B_2$--.

COLUMN 21
Line 32, "An" should read --A--.

COLUMN 22
Line 54, "surface.;" should read --surface.--.

COLUMN 26
Line 16, "$msec^{31\ 1/2}$" should read --$msec^{-1/2}$--.

COLUMN 29
Line 34, "precedent" should read --preceding--.

COLUMN 34
Line 1, "1:50" should read --1: 50--.

UNITED STATES PATENT AND TRADEMARK OFFICE
CERTIFICATE OF CORRECTION

PATENT NO. : 7,347,890 B2
APPLICATION NO. : 11/313959
DATED : March 25, 2008
INVENTOR(S) : Yasuhiro Nito et al.

It is certified that error appears in the above-identified patent and that said Letters Patent is hereby corrected as shown below:

COLUMN 43
Line 35, "the cyan" should read --a cyan--.
Line 37, "plurality" should read --a plurality--.

Signed and Sealed this

Ninth Day of December, 2008

JON W. DUDAS
*Director of the United States Patent and Trademark Office*